US012691441B2

(12) United States Patent
Matzger et al.

(10) Patent No.: US 12,691,441 B2
(45) Date of Patent: Jul. 28, 2026

(54) METHOD OF ACTIVATING METAL-ORGANIC FRAMEWORK WITH DIMETHYL ETHER

(71) Applicant: REGENTS OF THE UNIVERSITY OF MICHIGAN, Ann Arbor, MI (US)

(72) Inventors: Adam J. Matzger, Ann Arbor, MI (US); Keenan R. Wright, Ann Arbor, MI (US)

(73) Assignee: REGENTS OF THE UNIVERSITY OF MICHIGAN, Ann Arbor, MI (US)

( * ) Notice: Subject to any disclaimer, the term of this patent is extended or adjusted under 35 U.S.C. 154(b) by 426 days.

(21) Appl. No.: 18/239,396

(22) Filed: Aug. 29, 2023

(65) Prior Publication Data

US 2024/0066510 A1 Feb. 29, 2024

Related U.S. Application Data

(60) Provisional application No. 63/402,775, filed on Aug. 31, 2022.

(51) Int. Cl.
B01J 31/16 (2006.01)
B01J 31/18 (2006.01)

(52) U.S. Cl.
CPC ....... B01J 31/1691 (2013.01); B01J 31/1815 (2013.01); *B01J 2231/20* (2013.01); *B01J 2531/0216* (2013.01); *B01J 2531/26* (2013.01)

(58) Field of Classification Search
CPC .. B01J 20/226; B01J 31/1691; B01J 31/1815; B01J 31/2239; B01J 37/0018; B01J 2231/20; B01J 2531/0216; B01J 2531/0219; B01J 2531/16; B01J 2531/26
See application file for complete search history.

(56) References Cited

PUBLICATIONS

Wright, K.R., et al., 2022, Angewandte Chemie, 61, e202213190. <doi.org/10.1002/anie.202213190> (Year: 2022).*
Lee, J.Y., et al., 2007, Advanced Functional Materials, 17, 1255-1262. < https://doi.org/10.1002/adfm.200600944> (Year: 2007).*
Ayoub et al., Torsion Angle Effect on the Activation of UiO Metal-Organic Frameworks, ACS Appl. Mater. Interfaces, 11(17): 15788-15794 (May 2019).
Bae et al., Weak Coordination Bond of Chloromethane: A Unique Way to Activate Metal Node Within an Unstable Metal-Organic Framework DUT-34, Bull. Korean Chem. Soc., 42(4): 658-666 (Mar. 2021).
Boissonnault et al., Purification of Chloromethane by Selective Adsorption of Dimethyl Ether on Microporous Coordination Polymers, Langmuir, 32(38): 9743-9747 (Sep. 2016).
Caskey et al., Dramatic Tuning of Carbon Dioxide Uptake via Metal Substitution in a Coordination Polymer with Cylindrical Pores, J. Am. Chem. Soc., 130(33): 10870-10871 (Aug. 2008).
Chui et al., A Chemically Functionalizable Nanoporous Material [Cu3(TMA)2(H2O)3]n, Science, 283(5405): 1148-1150 (Feb. 1999).

(Continued)

*Primary Examiner* — Brian A Mccaig
(74) *Attorney, Agent, or Firm* — MARSHALL, GERSTEIN & BORUN LLP

(57) ABSTRACT

A method of activating a metal-organic framework material can include solvent exchanging the metal organic framework material with DME and then applying a vacuum to remove the DME and any residual solvent.

20 Claims, 16 Drawing Sheets

(56)         References Cited

PUBLICATIONS

Dietzel et al., Structural Changes and Coordinatively Unsaturated Metal Atoms on Dehydration of Honeycomb Analogous Microporous Metal-Organic Frameworks, Chem. Eur. J., 14(8): 2389-2397 (2008).

Dodson et al., Resolvation-Based Damage to Metal-Organic Frameworks and Approaches to Mitigation, ACS Mater. Lett., 1(3): 344-349 (Aug. 2019).

Dodson et al., The Metal-Organic Framework Collapse Continuum: Insights from Two- Dimensional Powder X-Ray Diffraction, Chem. Mater., 30(18): 6559-6565 (Sep. 2018).

Düren et al., Calculating Geometric Surface Areas as a Characterization Tool for Metal-Organic Frameworks, J. Phys. Chem. C, 111(42): 15350-15356 (Oct. 2007).

Elsaidi et al., Xenon Recovery at Room Temperature Using Metal-Organic Frameworks, Chem. Eur. J., 23(45): 10758-10762 (Aug. 2017).

Farha et al., Rational Design, Synthesis, Purification, and Activation of Metal-Organic Framework Materials, Acc. Chem. Res., 43(8): 1166-1175 (Jul. 2010).

Feldblyum et al., Reconciling the Discrepancies between Crystallographic Porosity and Guest Access As Exemplified by Zn-HKUST-1, J. Am. Chem. Soc., 133(45): 18257-18263 (Nov. 2011).

Feng et al., Destruction of Metal-Organic Frameworks: Positive and Negative Aspects of Stability and Lability, Chem. Rev., 120(23): 13087-13133 (Oct. 2020).

Hendon et al., Chemical Principles Underpinning the Performance of the Metal-Organic Framework HKUST-1, Chem. Sci., 6(7): 3674-3683 (May 2015).

Horike et al., Size-Selective Lewis Acid Catalysis in a Microporous Metal-Organic Framework with Exposed Mn2+ Coordination Sites, J. Am. Chem. Soc., 130(18): 5854-5855 (May 2008).

Howarth et al., Best Practices for the Synthesis, Activation, and Characterization of Metal-Organic Frameworks, Chem. Mater., 29(1): 26-39 (2017).

Kennedy et al., The Heat Capacity and Entropy, Heats of Fusion and Vaporization, and the Vapor Pressure of Dimethyl Ether. The Density of Gaseous Dimethyl Ether, J. Am. Chem. Soc., 63(8): 2267-2272 (Aug. 1941).

Kizzie et al., Effect of Humidity on the Performance of Microporous Coordination Polymers as Adsorbents for CO2 Capture, Langmuir, 27(10): 6368-6373 (May 2011).

Klein et al., Route to a Family of Robust, Non-Interpenetrated Metal-Organic Frameworks with PTO-like Topology, Chem. Eur. J., 17(46): 13007-13016 (Nov. 2011).

Li et al., Establishing Microporosity in Open Metal-Organic Frameworks: Gas Sorption Isotherms for Zn(BDC) (BDC = 1,4-Benzenedicarboxylate), J. Am. Chem. Soc., 120(33): 8571-8572 (Aug. 1998).

Liu et al., Rapid and Enhanced Activation of Microporous Coordination Polymers by Flowing Supercritical CO2, Chem. Commun., 49: 1419-1421 (2013).

Ma et al., Rapid Guest Exchange and Ultra-Low Surface Tension Solvents Optimize Metal- Organic Framework Activation, Angew. Chem. Int. Ed., 56(46): 14618-14621 (Nov. 2017).

Millward et al., Metal-Organic Frameworks with Exceptionally High Capacity for Storage of Carbon Dioxide at Room Temperature, J. Am. Chem. Soc., 127(51): 17998-17999 (Dec. 2005).

Mondloch et al., Activation of Metal-Organic Framework Materials, CrystEngComm., 15: 9258-9264 (2013).

Mondloch et al., Are Zr6-Based MOFs Water Stable? Linker Hydrolysis vs. Capillary-Force-Driven Channel Collapse, Chem. Commun., 50(64): 8944-8946 (Aug. 2014).

Moosavi et al., Capturing Chemical Intuition in Synthesis of Metal-Organic Frameworks, Nat. Commun., 10(1):539 (Feb. 2019).

Nelson et al., Supercritical Processing as a Route to High Internal Surface Areas and Permanent Microporosity in Metal-Organic Framework Materials, J. Am. Chem. Soc., 131(2): 458-460 (Jan. 2009).

Rosi et al., Hydrogen Storage in Microporous Metal-Organic Frameworks, Science, 300(5622): 1127-1129 (May 2003).

Rowsell et al., Effects of Functionalization, Catenation, and Variation of the Metal Oxide and Organic Linking Units on the Low-Pressure Hydrogen Adsorption Properties of Metal-Organic Frameworks, J. Am. Chem. Soc., 128(4): 1304-1315 (Feb. 2006).

Rowsell et al., Strategies for Hydrogen Storage in Metal-Organic Frameworks, Angew. Chem. Int. Ed., 44(30): 4670-4679 (Jul. 2005).

Schnobrich et al., Linker-Directed Vertex Desymmetrization for the Production of Coordination Polymers with High Porosity, J. Am. Chem. Soc., 132(39): 13941-13948 (Oct. 2010).

Wang et al., State of the Art and Prospects in Metal-Organic Framework (MOF)-Based and MOF- Derived Nanocatalysis, Chem. Rev., 120(2): 1438-1511 (Jan. 2020).

Wong-Foy et al., Exceptional H2 Saturation Uptake in Microporous Metal-Organic Frameworks, J. Am. Chem. Soc., 128(11): 3494-3495 (2006).

Wu et al., Heat Capacity of Saturated and Compressed Liquid Dimethyl Ether at Temperatures from (132 to 345) K and at Pressures to 35 MPa, J. Chem. Eng. Data, 63(5): 1713-1723 (Apr. 2018).

Wu et al., Vapor Pressure Measurements of Dimethyl Ether from (213 to 393) K, J. Chem. Eng. Data, 53(9): 2247-2249 (Sep. 2008).

Wu et al., Vapor Pressure Measurements of Dimethyl Ether from (233 to 399) K, J. Chem. Eng. Data, 49(1): 32-34 (2004).

Zhang et al., A historical overview of the activation and porosity of metal-organic frameworks, Chem Soc Rev., 49:7406-7427 (2020).

* cited by examiner

METHOD OF ACTIVATING METAL-ORGANIC FRAMEWORK WITH DIMETHYL ETHER

CROSS-REFERENCE TO RELATED APPLICATION

The benefit of priority to U.S. Provisional Patent Application No. 63/402,775 filed Aug. 31, 2022, is hereby claimed and the disclosure is incorporated herein by reference in its entirety.

STATEMENT OF GOVERNMENT SUPPORT

This invention was made with government support under DE-SC0004888 awarded by the U.S. Department of Energy. The government has certain rights in the invention.

FIELD

The disclosure relates to solvent exchange and/or activation of metal-organic framework materials with dimethyl ether.

BACKGROUND

Porosity is central to most applications of metal-organic frameworks (MOFs). To access pores for gas adsorption, MOFs must undergo removal of the synthesis solvent. Known as activation, this process usually involves two steps. The first step is solvent exchange, where a high boiling point, often high surface tension solvent, is exchanged from the pores of the MOF for a lower boiling point and lower surface tension solvent. This process typically involves multiple exchanges with solvent choice depending on the fragility of the MOF. Process costs and environmental impact depend on this step of activation because the solvent volume used often exceeds that used in MOF synthesis. The second step in activation requires solvents to be evacuated, usually using a combination of dynamic vacuum (mTorr range) and elevated temperature to remove solvent present inside the pores and, depending on the MOF, coordinated to metal centers. During evacuation, heating is typically required to complete solvent removal; however, damage to MOF structural integrity and collapse can occur, which is especially challenging for fragile frameworks with high potential surface areas. The challenges motivate reducing the number of exchange steps needed and the use of milder evacuation conditions: a delicate balance that can be potentially reached through judicious selection of activation solvent. Ideally an activation solvent would allow for direct exchange from the synthesis solvent and have a low enough boiling point to be removed at temperatures as close to room temperature as possible.

SUMMARY

A method of treating a solvent-containing metal-organic framework material to displace the solvent can include contacting the solvent-containing metal-organic framework material with a dimethyl ether, wherein the dimethyl ether exchanges with solvent present in the pores and coordinated on metal sites of the metal-organic-framework material to thereby provide a metal-organic framework material exchanged with dimethyl ether. A method of activating a solvent-containing metal-organic framework material can include contacting the solvent-containing metal-organic framework material with a dimethyl ether, wherein the dimethyl ether exchanges with solvent present in the pores and coordinated on metal sites of the metal-organic-framework material to thereby provide a metal-organic framework material exchanged with dimethyl ether; and applying a vacuum to the metal-organic framework material exchanged with dimethyl ether to remove residual solvent and dimethyl ether to thereby activate the metal-organic framework material.

DETAILED DESCRIPTION

Figure 1:
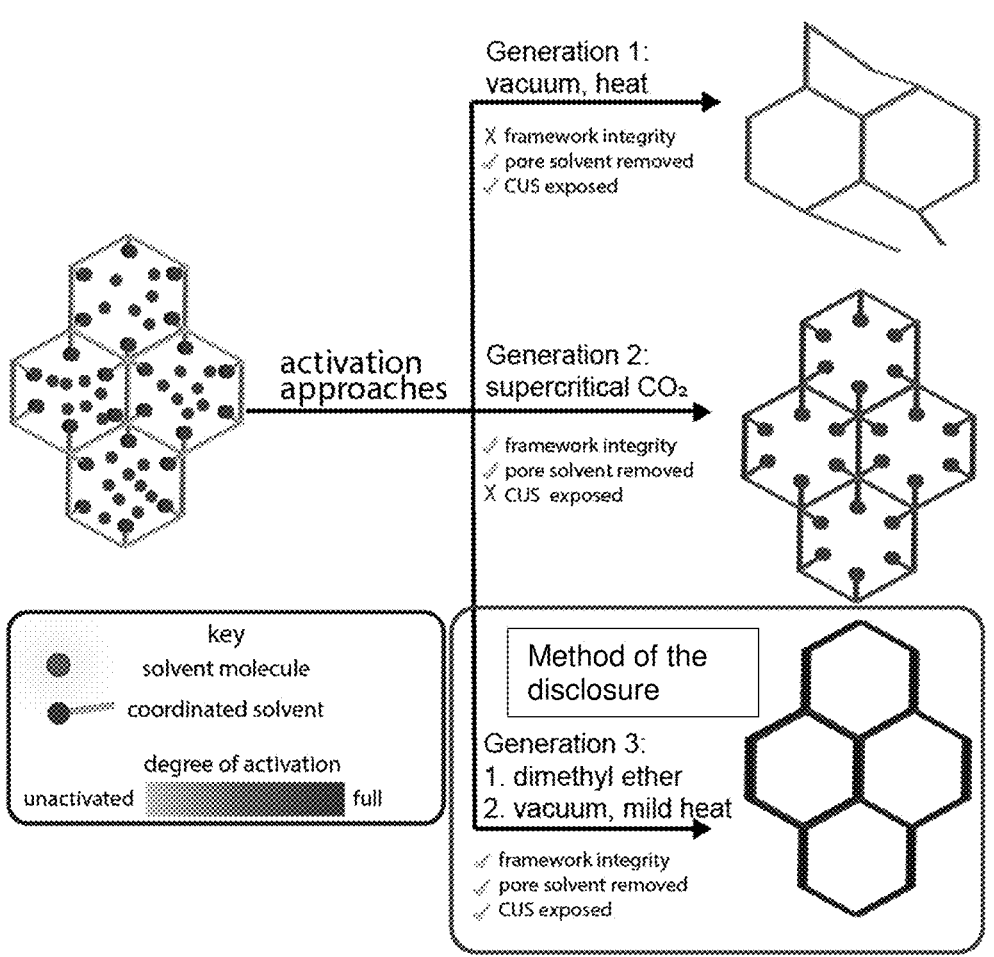
FIG. 1 is a schematic illustration comparing activation methods of the disclosure as compared to conventional activation methods using vacuum and high heat or supercritical $CO_2$.

MOFs with coordinatively unsaturated sites (CUS) are promising candidates for many applications including hydrogen storage and catalysis. CUS MOFs contain metal sites that are not bound to molecules, when fully activated, allowing direct binding of solvents and gasses based on their affinity. However, the challenge with CUS MOFs is activation. The same feature that makes them interact strongly with guest molecules are precisely the reason for the difficulty they present in activation: the metal sites are high affinity binding locations for dative ligands of all types. For highly porous CUS MOFs there are all the same concerns as non-CUS MOFs as well. If high surface tension solvents are employed, the pores can collapse due to capillary forces. The method to overcome this is well understood to be exchange with low boiling point and low surface tension solvents. The ultimate demonstration of this approach is supercritical fluid exchange using $CO_2$. The limitation when applying this approach to CUS MOFs is that $CO_2$ is too weak of a ligand to remove solvents directly bound to the metals, and therefore CUS exposure is incomplete. To overcome this problem, methods of the disclosure use dimethyl ether (DME) as an activation solvent. DME has a very low boiling point (−24° C.) which makes evacuation facile. The surface tension of DME is 12 mN m⁻¹ is much lower than commonly used activation solvents such as $CH_2Cl_2$, acetone, and DMF, which minimizes the capillary forces during solvent removal.

Methods of the disclosure include exchanging solvated MOFs with DME. Without intending to be bound by theory, it is believed that DME can displace solvent that is adsorbed in the pores as well as solvent coordinated to the framework of the MOF. Methods of the disclosure also provide for activation of the MOFs using DME. DME activation was demonstrated to be successful for both coordinatively unsaturated sites (CUS) and non-CUS MOFs. DME displaces solvent molecules, such as DMF or MeOH, occupying the pores of the MOF as well as those coordinated to metal centers. This methods of the disclosure allow for reduced evacuation temperature by suing a coordinating, yet highly volatile guest (DME), which enables low temperature activation with structural retention. Structural retention was demonstrated in several MOFs through nitrogen adsorption measurements. MOFs activated in accordance with the disclosure had nitrogen adsorption measurements that matched or exceeded existing activation protocols. As compared to existing activation protocols, the use of DME offers a more cost effect and simple process, particularly as compared to critical point drying methods and supercritical fluid activation methods.

In accordance with the disclosure a method of treating a solvent-containing metal-organic framework material to displace the solvent can include contacting the solvent-containing metal-organic framework material with a dimethyl ether. The dimethyl ether exchanges with the solvent, which can be present in the pores and/or coordinated on metal sites of the metal-organic-framework material to thereby provide a metal-organic framework material exchanged with dimethyl ether.

The method of the disclosure can further include activation of the dimethyl ether exchanged MOF by subjecting the dimethyl exchanged MOF to a vacuum to remove the dimethyl ether and other guest species present in the MOF. The activation can be performed at room temperature, for example. Use of elevated temperatures during activation are also contemplated herein. For example, the temperature during application of the vacuum can be less than or equal to about 150° C. For example, the temperature can be about 25, 30, 35, 40, 45, 50, 55, 60, 65, 70, 75, 80, 85, 90, 95, 100, 105, 110, 115, 120, 125, 130, 135, 140, 145, 150° C., and any ranges defined by such value or any values therebetween. For example, the dimethyl exchanged MOF can be subjected to vacuum while being heated in an oil bath.

During exchange of the solvent with the dimethyl ether, dimethyl ether can be flowed over the solvent-containing metal-organic framework in a batch or continuous process. In a batch process, for example, the solvent-containing MOF can be placed in a container, which can be filled with dimethyl ether and held for a treatment time or vented immediately after filling. The treatment time can be, for example, about 1 hour to about 20 hours, about 8 hours to about 15 hours, about 1 hour to about 10 hours, about 2 hours to about 8 hours, or about 4 hours to about 6 hours. Other suitable times include about 1, 2, 3, 4, 5, 6, 7, 8, 9, 10, 11, 12, 13, 14, 15, 16, 17, 18, 19, or 20 hours or any ranges defined by such values or any values there-between. The batch process can be repeated one or more times for repeated treatments to ensure removal of all or substantially all of the solvent.

Alternatively, in a continuous process, the dimethyl ether can be flowed continuously into the container containing the solvent-containing MOF while continuously venting the container. The continuous flowing of dimethyl ether can be maintained for a treatment time of about 1 hour to about 20 hours, about 8 hours to about 15 hours, about 1 hour to about 10 hours, about 2 hours to about 8 hours, or about 4 hours to about 6 hours. Other suitable times include about 1, 2, 3, 4, 5, 6, 7, 8, 9, 10, 11, 12, 13, 14, 15, 16, 17, 18, 19, or 20 hours or any ranges defined by such values or any values there-between.

The dimethyl ether can be flowed at a pressure such that it is in the gaseous state or in the liquid state. Methods of the disclosure can include flowing the dimethyl ether at a pressure in the gaseous state and flowing the dimethyl ether at a pressure in the liquid state, such that the solvent-containing MOF is treated with a mixture of gaseous and liquid dimethyl ether.

Any MOF can be treated using the methods of the disclosure. For example, the methods of the disclosure can be used for solvent exchange and/or activation of non-CUS MOFs, CUS-MOFs, and thermally sensitive MOFs. The solvent present in the MOF can be a residual solvent remaining from formation of the MOF. The solvent can be present in the pores and/or coordinated with metal sites of the MOF. The solvent can be, for example, an alcohol, a ketone, and/or formamide. For example, the formamide can be dimethylformamide (DMF) and/or diethylformamide (DEF). The alcohol can be, for example, methanol and/or ethanol. The ketone can be, for example, acetone. The solvent-containing MOF can contain, for example, both DMF and methanol.

Methods of the disclosure can result in activation of the MOF with at least substantially the same or even increased resulting surface area of the activated MOF as compared to conventional activation methods required supercritical fluids and/or significantly higher temperatures.

MOF-5 is a representative system for non-CUS MOFS and was used to test the functional compatibility with displacement of solvent in pores directly without the need for intermediate solvent exchange steps. Activation of MOF-5 with DME at room temperature yielded a material with an average BET surface area of 3400 $m^2/g\pm50$ $m^2/g$, consistent with full activation. This result demonstrates that DME can directly displace dimethylformamide (DMF) in the pores. Degradation due to impurities in DME was found not to be significant.

HKUST-1 is a model system for CUS-MOFs. HKUST-1 has a copper paddlewheel secondary building unit (SBU) in which four carboxylates are bound equatorially to the Cue dimer and, when activated properly, there are two open copper sites in the axial positions of the SBU. HKUST-1 is challenging to fully activate because the solvent molecules coordinate on the copper sites. HKUST-1 was first reported in 1999 and synthesized in a solvent mixture of DMF: ethanol:water with a surface area of 695 $m^2/g$. About twenty years later, the upper limit for surface area had risen to 2000 $m^2/g22$ and this slow evolution to achieve high surface area is consistent with the complexities of achieving full activation of CUS MOFs. The higher surface areas have been achieved when activating from methanol (MeOH)25; however, high temperature (~200° C.) is required for complete guest evacuation and overcoming the strong coordination of the solvent remains a challenge using conventional methods.

To assess the effectiveness of DMF displacement by DME and to test binding affinity of DME to Cu, DME removal from HKUST-1 was probed with thermogravimetric analysis coupled to infrared spectroscopy (TGA-IR). TGA distinguishes between bound and unbound solvent molecules for CUS MOFs and places an upper limit on the temperature required to remove solvent from the MOF. IR spectroscopy identifies residual solvent after exchange, which informs if DMF remains after a single wash. This can determine whether additional DME exchanges are required. Additionally, the DME exchanged samples were digested and analyzed by Nuclear Magnetic Resonance (NMR) spectroscopy to quantify residual DMF in the MOF and the corresponding percentage of DMF-coordinated metal centers in HKUST-1.

Figure 11:
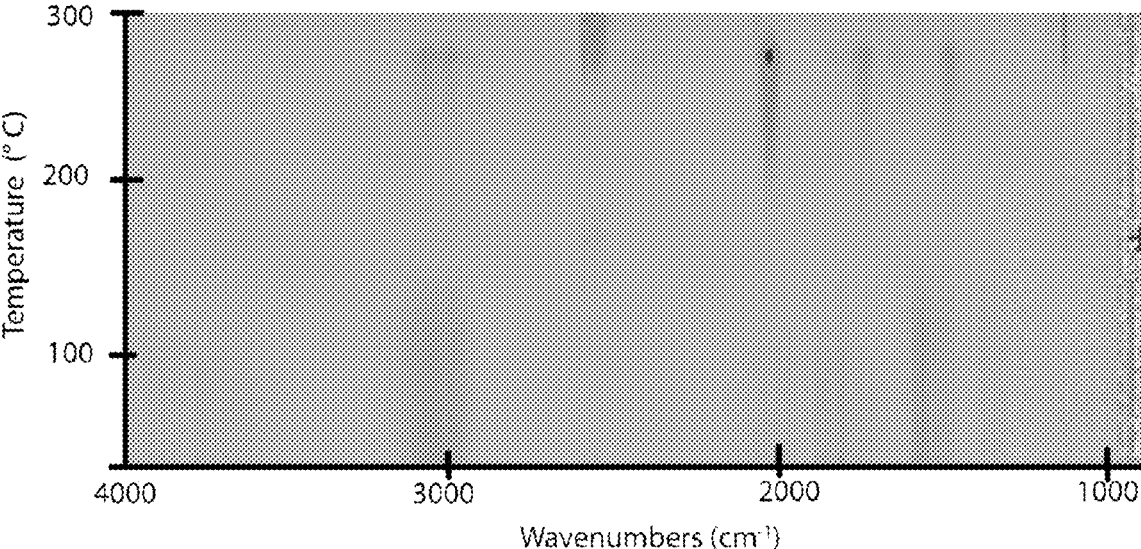
FIG. 11 is a two-dimensional contour plot of IR spectra of 1-hour DME exchanged HKUST-1, where experimental heating parameters were set to 25-300° C. at a ramp rate of 5° C./min.
Figure 12:
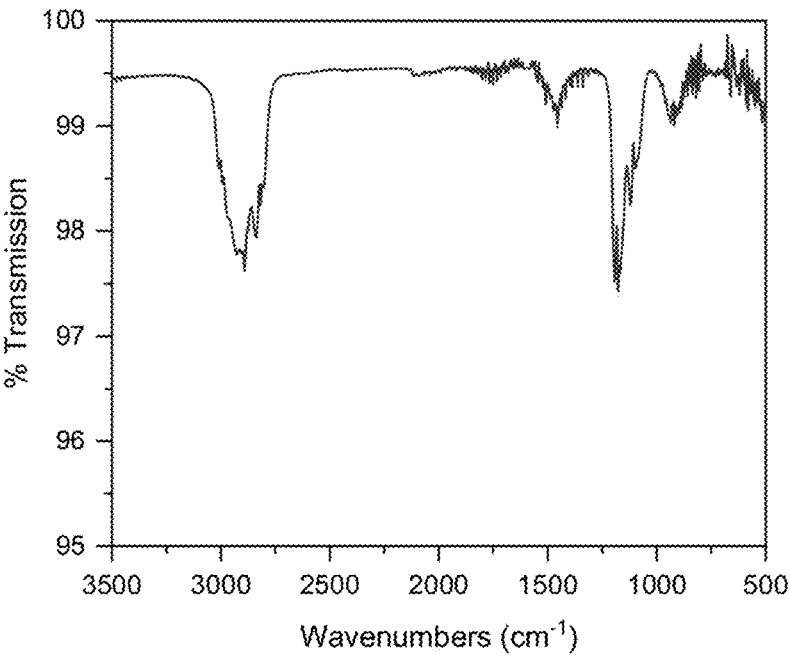
FIG. 12 is an IR spectrum of DME from 1-hour DME exchanged HKUST-1 at 87° C., showing that the DME exchanged HKUST-1 contained DME and did not contain DMF.

As synthesized HKUST-1 was washed 3 times in fresh DMF to fully exchange the MOF into DMF and remove residual starting reagents. The MOF was analyzed by TGA-IR; a dramatic decrease in the mass at temperatures between 25-100° C. is associated with DMF in intercrystal-line regions or weakly held inside of the pores (FIGS. 11 and 12). At temperatures above 250° C. an acceleration in mass loss is observed indicating that coordinated DMF evolves from the MOF.

Figure 2:
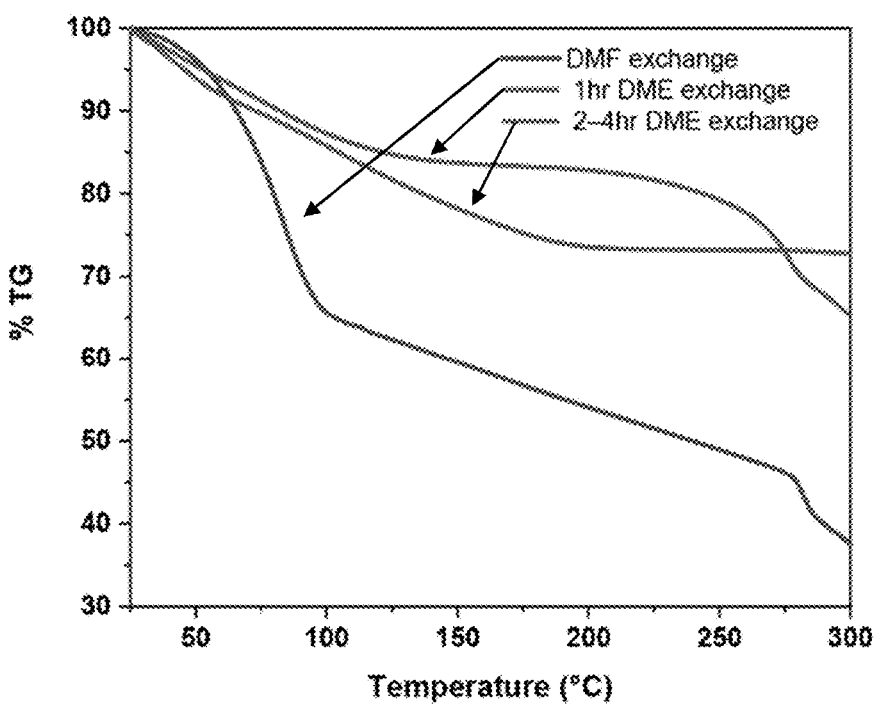
FIG. 2 is a TGA thermogram of DMF and DME exchanged HKUST-1 from room temperature to 300° C.

After 1 hour of DME exchange, HKUST-1 was analyzed by TGA-IR. A relatively constant rate of mass loss occurs until 125° C. (FIG. 2). This corresponds to DME inside of the pores evolving. Relatively little change occurred at temperatures between 125° C. and 250° C.; however, a second drop in mass was observed at temperatures above 250° C. associated with DMF (FIG. 2) coordinated to the Cu(II) sites. This temperature corresponds closely to the more tightly bound DMF when TGA-IR was conducted on HKUST-1 in DMF (see FIG. 13). Digesting this MOF after 1 hour of DME exchange corresponded to 15% of Cu(II) still being coordinated to DMF. These results justified longer exchange times and/or multiple exchange steps to fully displace DMF.

Figure 10:
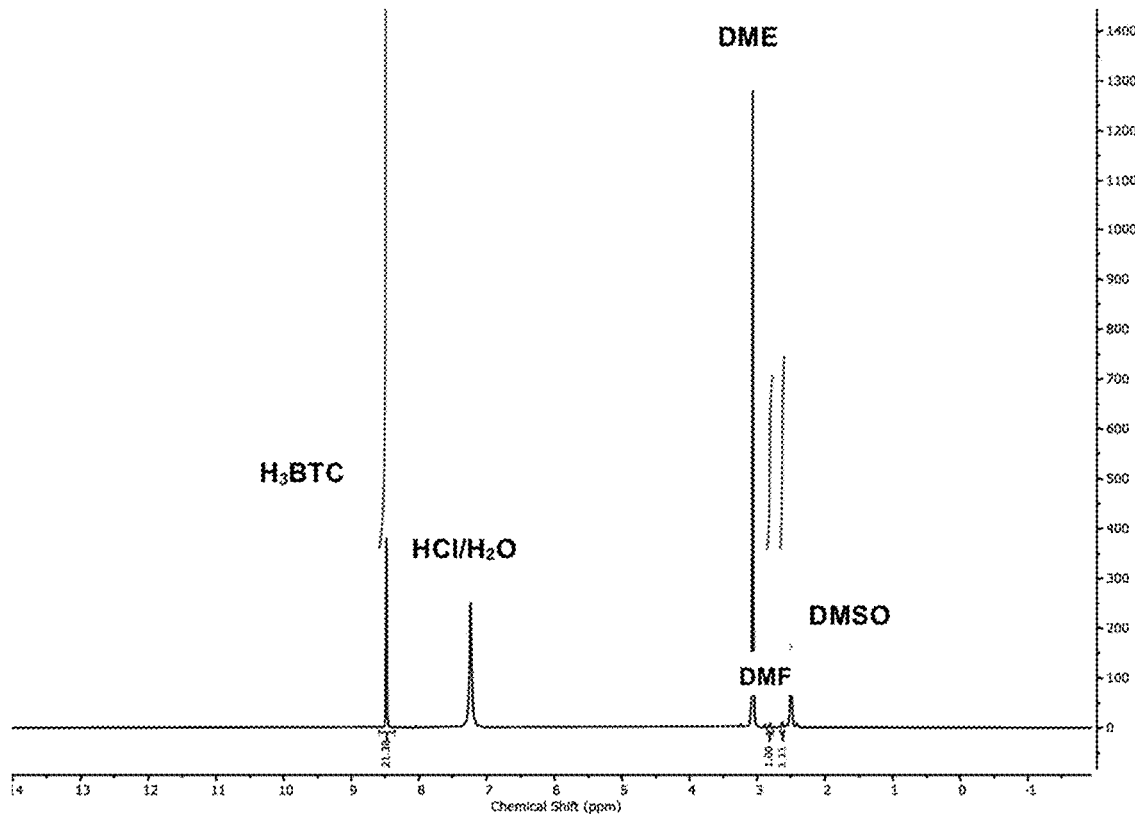
FIG. 10 is an $^1$H-NMR spectrum of twice DME exchanged and digested HKUST-1.
Figure 13:
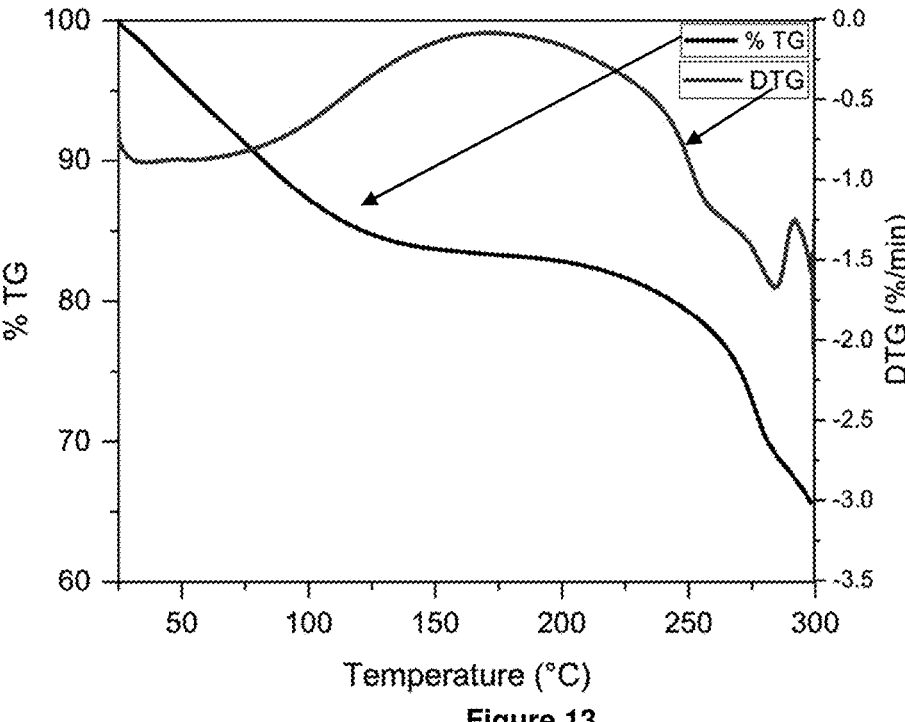
FIG. 13 is a TGA thermogram of 1-hour DME exchanged HKUST-1 from room temperature to 300° C. with $1^{st}$ derivative thermogram.
Figures 14, 15:
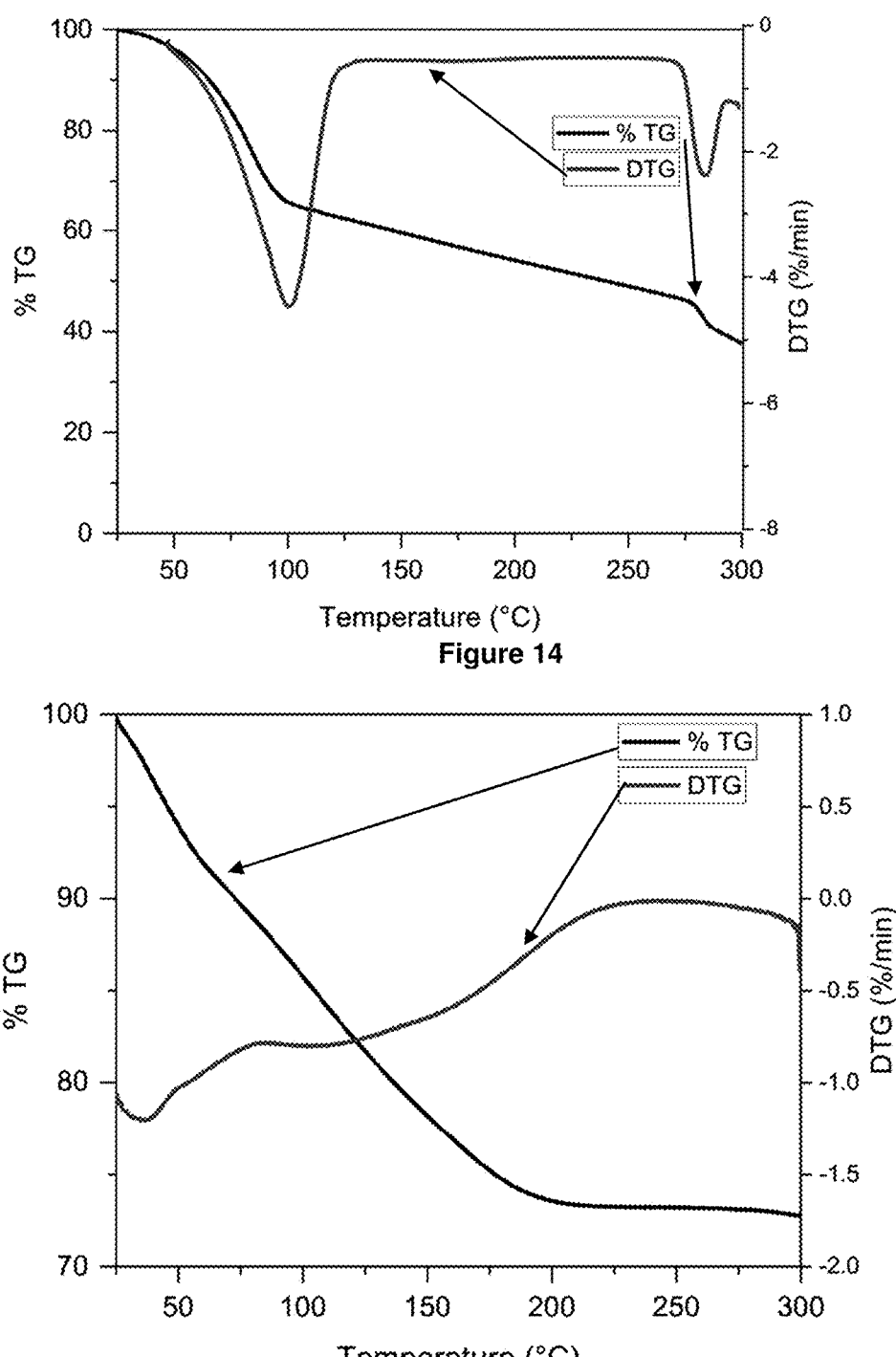
FIG. 14 is a TGA thermogram of DMF exchanged HKUST-1 from room temperature to 300° C. with $1^{st}$ derivative thermogram.
FIG. 15 is a TGA thermogram of twice 4-hour DME exchanged HKUST-1 from room temperature to 300° C. with $1^{st}$ derivative thermogram.

Observing incomplete exchange after 1-hour of DME incubation, two washes with DME (over 8 hours) on HKUST-1 were performed to more fully displace DMF. The TGA trace showed an initial drop in mass that slows slightly above 50° C. The IR spectrum at all temperatures confirmed DME evolution (FIG. 2 and FIG. 13). Further into the experiment, no significant change in mass was found at temperatures greater than 175° C., indicating that all solvent was removed. This contrasts with the 1-hour exchange wherein at 175° C. DMF remained. After the two DME exchanges, the MOF was digested for NMR analysis and 3% of copper remained coordinated to DMF (FIGS. 10 and 15).

Figure 3:
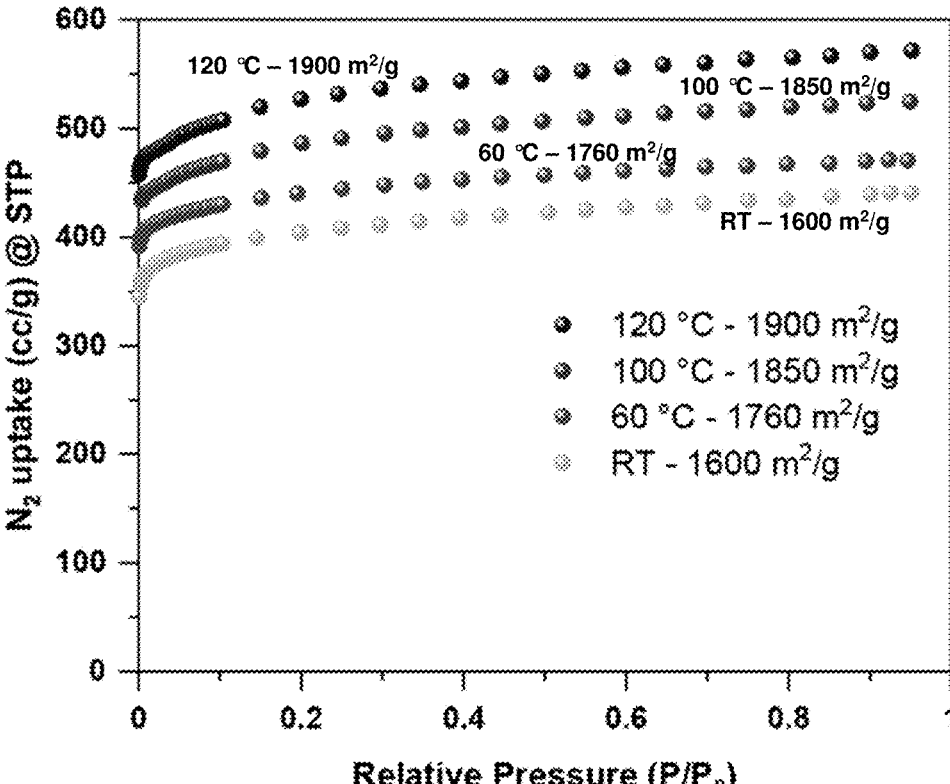
FIG. 3 is a graph of nitrogen adsorption isotherms of DME exchanged HKUST-1 at different activation temperatures.

With CUS-MOFs, higher temperatures are often required to remove coordinated solvents. The need for higher temperatures can be disadvantageous with thermally sensitive MOFs, leading to degradation. Activation of HKUST-1 at different temperatures, room temperature, 60° C., 100° C., and 120° C., was analyze to find the lowest temperature for activation with high surface area. Referring to FIG. 3, nitrogen adsorption isotherms showed that nitrogen uptake, corresponding to accessible pore volume, increased as activation temperature increased, which is consistent with more guest removal. At 120° C., a surface area of 1900 $m^2/g$ was achieved, which is near the upper limit of surface areas reported for HKUST-1. It was observed that further heating to 200° C. did not lead to higher surface area. Activation of the CUS-MOFs using methods of the disclosure was able to use significantly lower temperatures than conventional activation methods. For example, the methods of the disclosure can achieve activation of CUS-MOFs at temperatures that are 50° C. to 80° C. less than used in conventional activation procedures.

Figure 4:
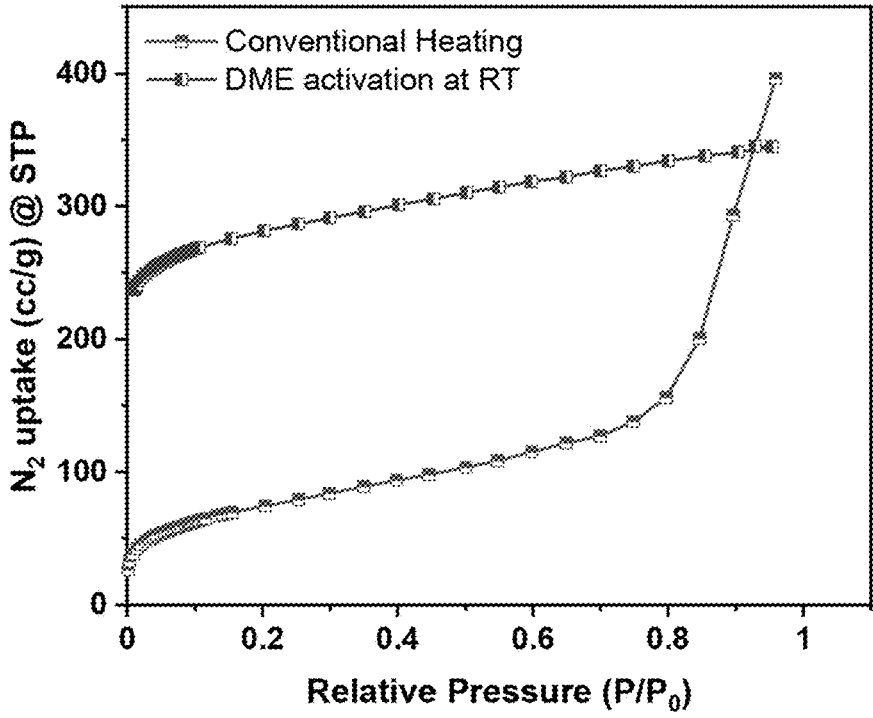
FIG. 4 is a graph of nitrogen adsorption isotherms of conventional and DME exchanged UMCM-151.
Figure 23:
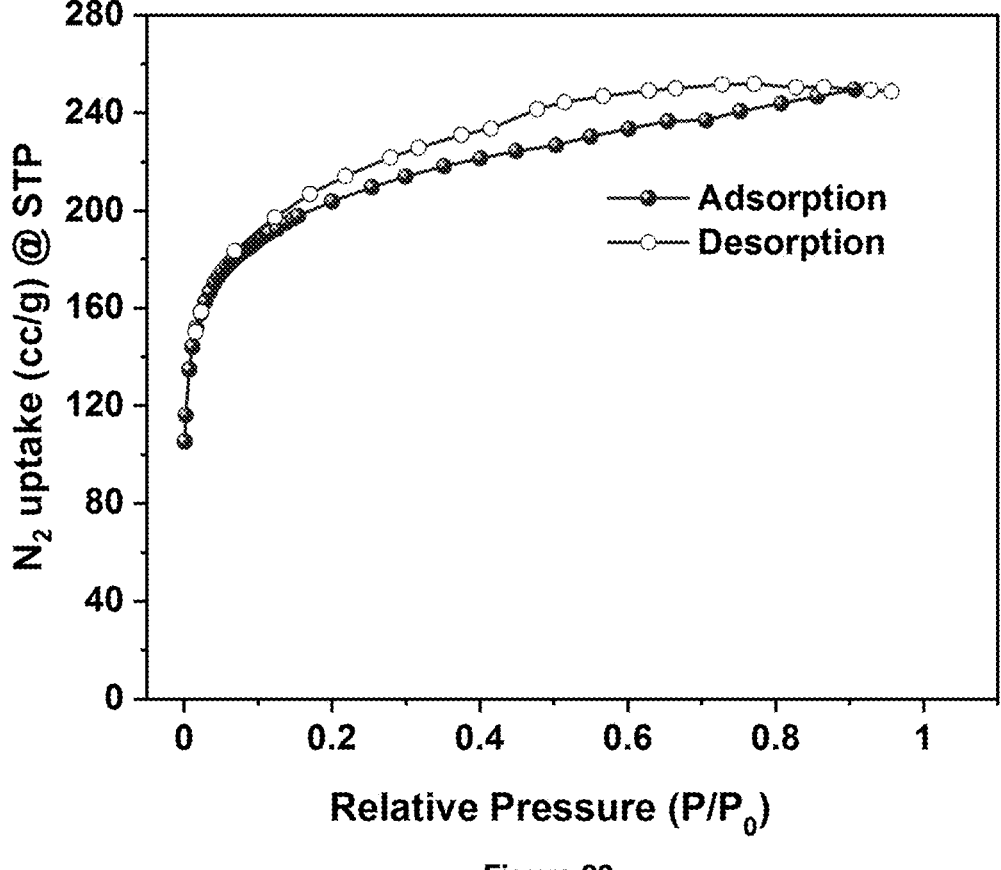
FIG. 23 is a graph of a nitrogen sorption isotherm at 77K for supercritical $CO_2$ activated DUT-34, the material had a BET surface area of 744 m²/g.
Figure 24:
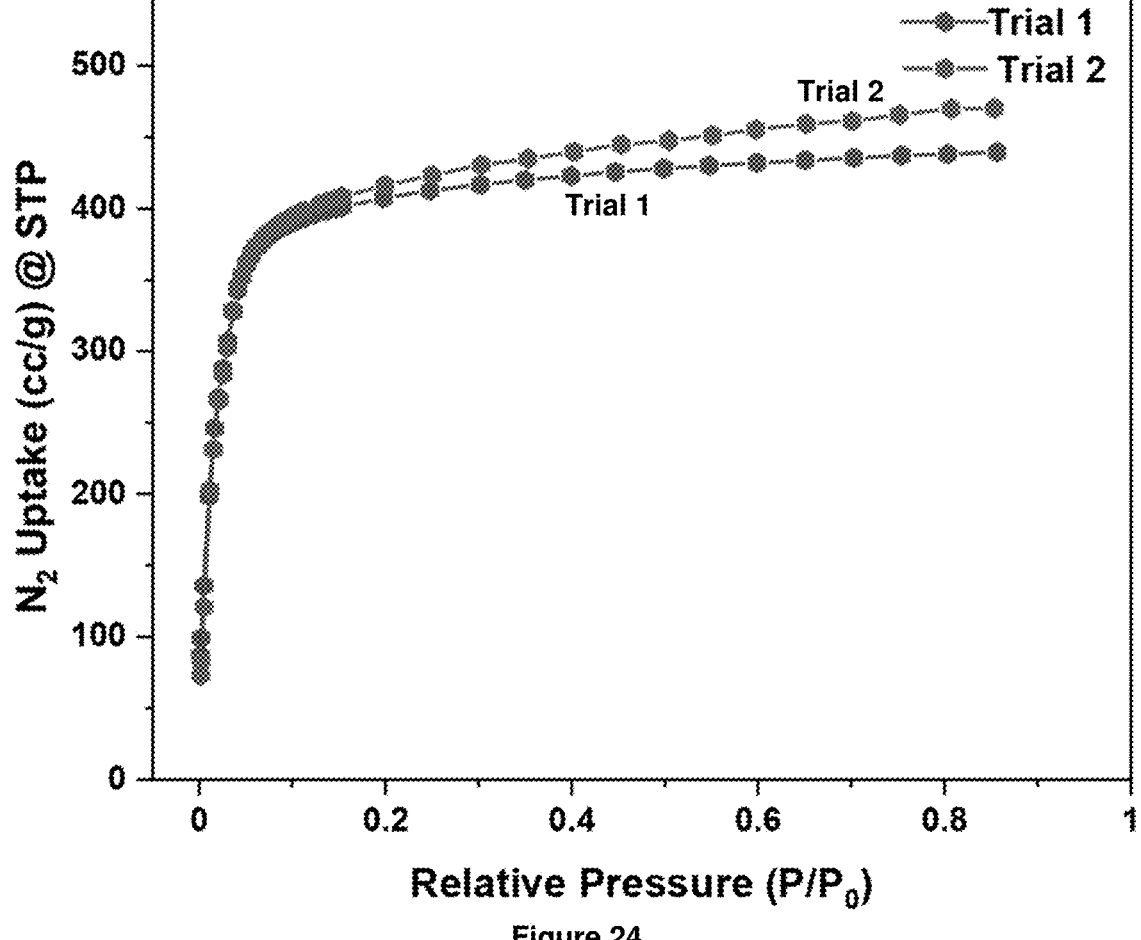
FIG. 24 is a graph of nitrogen sorption isotherms at 77K for twice DME exchanged room temperature activated DUT-34, the material had an average BET surface area of about 1600 m²/g.

The methods of the disclosure were also tested on thermally sensitive MOFs. UMCM-151 and DUT-34 were activated using the method of the disclosure. Activating UMCM-151 from acetone yields a BET surface area of 263 $m^2/g$ whereas by employing DME in accordance with the disclosure, a BET surface area of 950 $m^2/g$ was obtained (FIG. 4). The shape of the isotherm changed dramatically, which is consistent with collapse when activating from acetone. DUT-34 is a copper paddlewheel MOF for which the surface area has not been reported in the literature, a common occurrence for thermally sensitive MOFs. Supercritical $CO_2$ activation was performed, and a surface area of 744 $m^2/g$ was obtained. Through DME activation in accordance with the disclosure, a surface area of ~1600 $m^2/g$ was reached (FIGS. 23 and 24). Both UMCM-151 and DUT-34 were activated using the methods of the disclosure at room temperature. Activating UMCM-151 and DUT-34 at room temperature demonstrates the mildness and ease of solvent evacuation using DME. Methods of the disclosure advantageously allow for activation with high surface areas of these thermally sensitive MOFS, where all previous approaches failed.

Although copper paddlewheels are the most common SBU for CUS MOFs, there are other SBUs and metals that are used to construct MOFs. For example, MOF-74 contains an infinite rod SBU and can be synthesized using different metals (including Co, Ni, Mg, Zn) each with its own adsorption affinity for solvents and gases. To activate MOFs with this SBU, the DME exchange and evacuation method developed with HKUST-1 was applied to MOF-74 made with Mg and with Zn.

Figure 5:
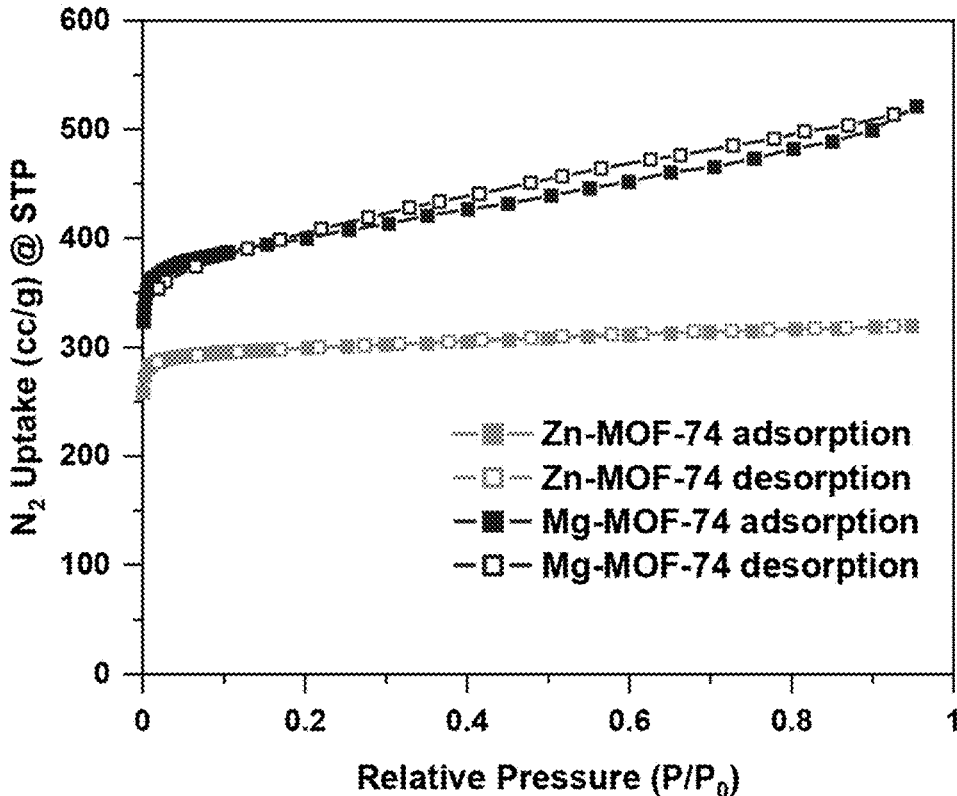
FIG. 5 is a graph of nitrogen adsorption isotherms of DME exchanged MOF-74 (Zn and Mg) activated at 120° C.

Mg-MOF-74 exhibits exceptional $CO_2$ adsorption affinity at ambient temperatures and low pressures relevant to flue gas applications. However, the coordination to DMF (residual from synthesis) and MeOH presents a challenge for complete activation. In the case of Mg-MOF-74 the MOF was first exchanged into MeOH, to remove residual synthesis solvent, and then activated from DME at 120° C. An average BET surface area of 1575 $m^2/g$ was achieved which matches well with fully activated material made by heating at 270° C. under vacuum (FIG. 5). In the case of Zn-MOF-74, this MOF has a reported BET surface area ranging from 800-1100 $m^2/g$ which is lower than its theoretical surface area of 1336 $m^2/g$. Part of this gap in accessible surface area is due to potential collapse, or the presence of residual coordinated solvent after activation. When activating this MOF by conventional supercritical $CO_2$, an additional vacuum and heating step at 270° C. is required to remove coordinated solvent. Under these activation conditions a surface area of 1119 $m^2/g$ has been accomplished. While this result is an improvement over the reported surface area of ~800 $m^2$, supercritical $CO_2$ only clears solvent molecules from the pores with the subsequent heating step being required to remove coordinated strongly solvent molecules. Using DME in accordance with the disclosure, both the unbound and bound guest molecules were observed to be displaced, and evacuation yielded a reproducible surface area of 1250 $m^2/g$, which is higher than supercritical $CO_2$, while allowing for use of a temperature of 120° C. (150° C. less than the conventional method).

Examples

As described above, the methods of the disclosure were used to solvent exchange and activate MOF-5, HKUST-1, UMCM-151, DUT-34, and Zn-mOF-74. MOF-5 is a representative system for no-CUS MOFs. HKUST-1 is a model system for CUS MOFs due to its copper paddlewheel secondary binding unit (SBU) in which four carboxylate are bound equatorially to the $CU_2$ dimeter and, when activated properly, there are two open copper sites in the axial positions of the SBU. UMCM-151 and DUT-34 are thermally sensitive MOFs. MOF-74 contains an infinite rod SBU and can be synthesized using different metals (including Co, Ni, Mg, and Zn), each with its own adsorption affinity for solvents and gasses.

Materials: Solvents: dimethylformamide (DMF, Fisher Scientific, ACS grade), acetone (99.8%, Extra Dry, AcroSeal), 1,4-dioxane (ACS grade, Fisher Scientific), ethanol (EtOH, Decon Labs, 200 proof), methanol (MeOH, Fisher Scientific, ACS grade), diethylformamide (DEF, TCI America, 99%, purified by storage on activated charcoal for ~1 month followed by removal of impurities via silica gel column), dimethyl ether (DME, Airgas 99.5%), dimethyl sulfoxide-$d_6$ (DMSO-$d_6$, Sigma-Aldrich, 99.9% atom D), deuterium chloride (35 wt. % DCI in $D_2O$), Sigma-Aldrich, 99 atom % D). Deionized water was used for all syntheses where $H_2O$ was required.

To minimize solvent water content, MeOH and EtOH were stored over 3 Å activated sieves whereas DEF was stored over 4 Å activated sieves.

Metal Salts: copper(II) nitrate hemi(pentahydrate) (Cu$(NO_3)_2$·2.5$H_2O$, Fisher Scientific, ACS reagent, 98%), magnesium acetate tetrahydrate (Mg$(OAc)_2$·4$H_2O$, Fisher Scientific, 98% ACS reagent), zinc nitrate hexahydrate (Zn$(NO_3)_2$·6$H_2O$ Fisher Scientific, 99.98%)

Organic Linkers: benzene-1,3,5-tricarboxylic acid ($H_3BTC$, TCI, 98%), 2,5-dihydroxyterephthalic acid ($H_4DOBDC$, Hang Zhou Trylead Chemical Technology Corporation Ltd., 97%), benzene-1,4-dicarboxylic acid ($H_2BDC$, Sigma Aldrich, 98%), 1,3,5-tris(4-carboxyphenyl) benzene ($H_3BTB$, Alfa Aesar, 97%). All linkers were used without further purification.

Other synthesis materials: methyl 3,5-dibromobenzoate and 4-(methoxycarbonyl)phenylboronic acid (98% and 96% respectively, TCI America), tetrakis(triphenylphosphine) palladium(0), 99% (99.9+%-Pd, Strem Chemicals), pyridine (ACS grade, Fisher Scientific), potassium phosphate tribasic (97%, Fisher Scientific), potassium hydroxide (Fisher Scientific)

Figure 6:
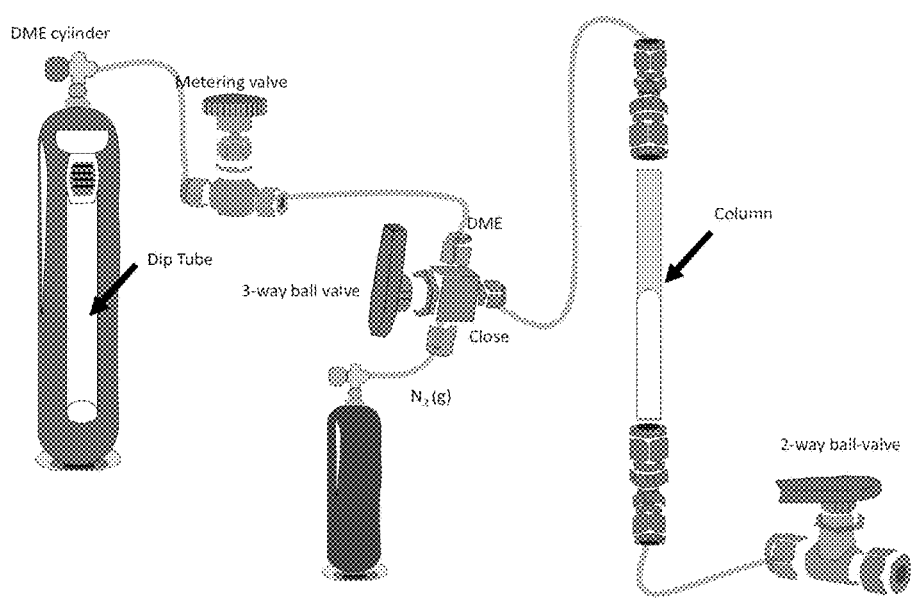
FIG. 6 is a schematic illustration of a representative apparatus for treating a solvent-containing MOF in accordance with the disclosure.

DME Exchange: The experimental setup used in the example is shown in FIG. 6. Solvated MOF was loaded (via 9" glass pipette) into a glass column (approximately 3.5 mL volume) plugged at the bottom with 4-micron quartz wool to retain the sample. The column was then installed into the apparatus via ¼" Swagelok fittings. For all MOFs, the column was initially filled with DME and then immediately vented. Two subsequent cycles of DME filling followed by venting were performed over the course of 8 hours.

The DME washing apparatus consisted of the following parts: glass column (length=5" length, OD=¼"), stainless steel 1-piece 4G series 3-way ball valve (Swagelok), stainless steel tube fittings, ⅛"×¼" unions, soft coil copper tubing, CGA fitting 350 (for DME cylinder), needle valve, Teflon ferrules (for glass connections only), and a ⅛" two-way valve (Swagelok).

Apparatus Assembly. The 350 CGA fitting was attached to the DME gas cylinder (dip tube cylinder) to introduce DME through the metering valve that throttles the flow of DME into the vessel. At one end of the metering valve was a 3-way valve that opens the system to DME, nitrogen, or isolates the vessel. The two way-ball valve was connected to the column at the end of the apparatus to vent DME in and out of the column (this can optionally be substituted with a cap nut).

Activation Protocol: Once the MOF had been exchanged in DME as described above, the MOF was transferred into a glass activation bulb, placed on a Schlenk line, and dried under dynamic vacuum. While under dynamic vacuum, the vessel was evacuated at room temperature (for MOF-5, UMCM-151, and DUT-34) or heated at a constant temperature of 120° C. (HKUST-1 and Zn-MOF-74) in an oil bath. The MOF remained under vacuum and heating for 16-24 hours. The MOF was transferred to a nitrogen glovebox until further use.

NMR Sample Preparation by Digestion: The DME-exchanged MOF was digested in 600 μL of DMSO-$d_6$ and 100 μL of 35 wt. % DCI in $D_2O$.

Nitrogen ($N_2$) Sorption: $N_2$ isotherms were obtained using a Nova 4200e gas sorption analyzer by Quantachrome Instruments (Boynton Beach, Florida). $N_2$ (99.999% purity) was purchased from Cryogenic Gases and used as received. Samples were loaded into a calibrated sorption tube and isotherms were measured at 77K in the range of $5.0 \times 10^{-3} \leq P/P_o \leq 1$, collecting 45 adsorption points and 20 desorption points. Sample surface areas were calculated by using the BET method where the linear region was $0.02 \leq P/P_o \leq 0.05$. Data were collected using the NovaWin Software.

Thermogravimetric Analysis (TGA) and Infrared Spectroscopy (IR): TGA-IR data was collected using a PERSEUS TGA 209 F1 Libra® coupled to a Nicolet iS50 FTIR Spectrometer with TGA-IR module (Thermo Scientific). Samples (5 mg≤x≤15 mg) were loaded into a tared alumina crucible and then samples were heated from 20-300° C. at a ramp rate of 5° C./min. All data was collected and worked up in Omnic Spectra or Proteus Thermal Analysis.

Proton Nuclear Magnetic Resonance Spectroscopy ($^1$HNMR): NMR spectra were obtained using a 400 MHz spectrometer. All data were collected in NMR software VNMRJ then worked up using MestReNOVAx64.

MOF Synthesis: MOF syntheses followed reported literature protocols with minimal changes. Syntheses were performed in 20-60 mL vials sealed by Teflon-lined caps unless otherwise specified.

MOF-5: In a 60 mL vial, 4.44 g of $Zn(NO_3)_2 \cdot 6H_2O$ and 670 mg $H_2BDC$ were added to 50 mL of DEF. The mixture was sonicated for approximately 15 minutes to dissolve the salt and linker. Into five 20 mL scintillation vials, 10 mL of precursor solution were transferred. The vials were then placed into a preheated oven (100° C.) for 18-24 hours. After the time elapsed, the mother liquor was decanted, and the crystals were washed 3 times with DMF following the published procedure[2] Approximately 40 mg of MOF was then transferred to the apparatus for DME activation (exchange and evacuation).

Figure 7:
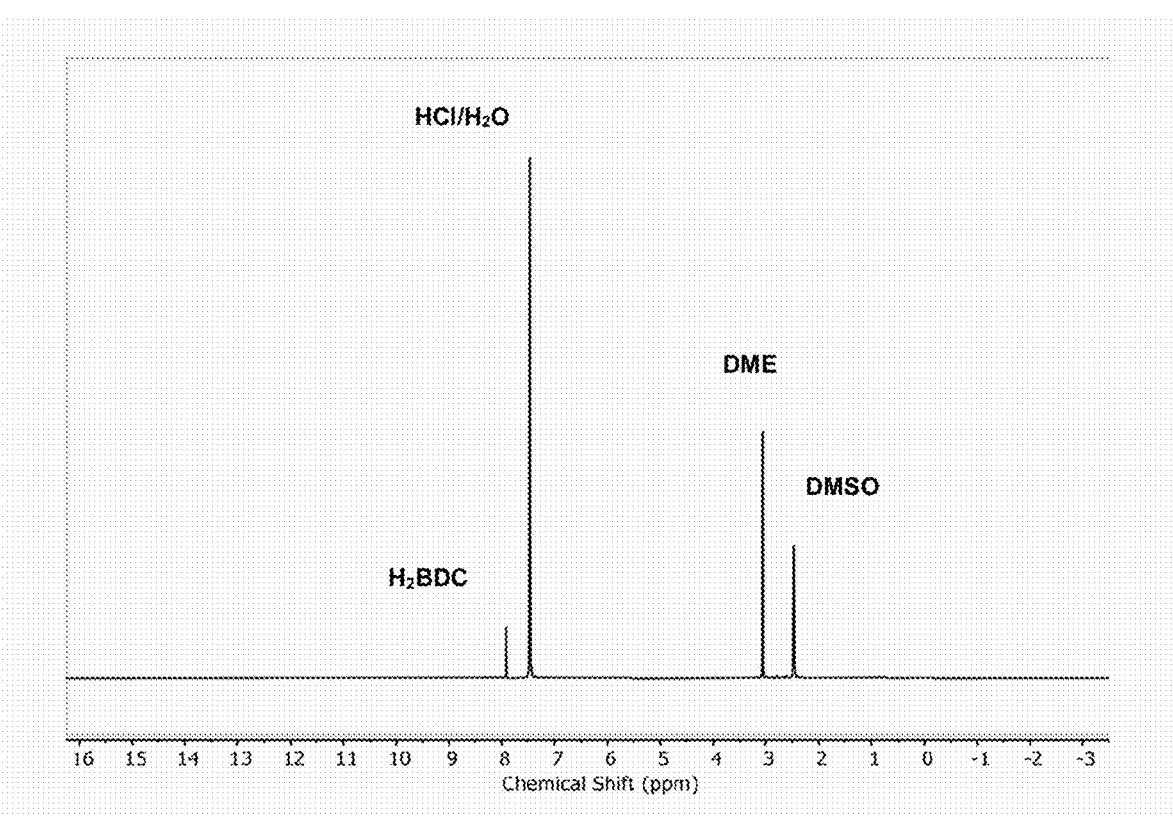
FIG. 7 is an $^1$H-NMR spectrum of twice DME exchanged and digested MOF-5.
Figure 8:
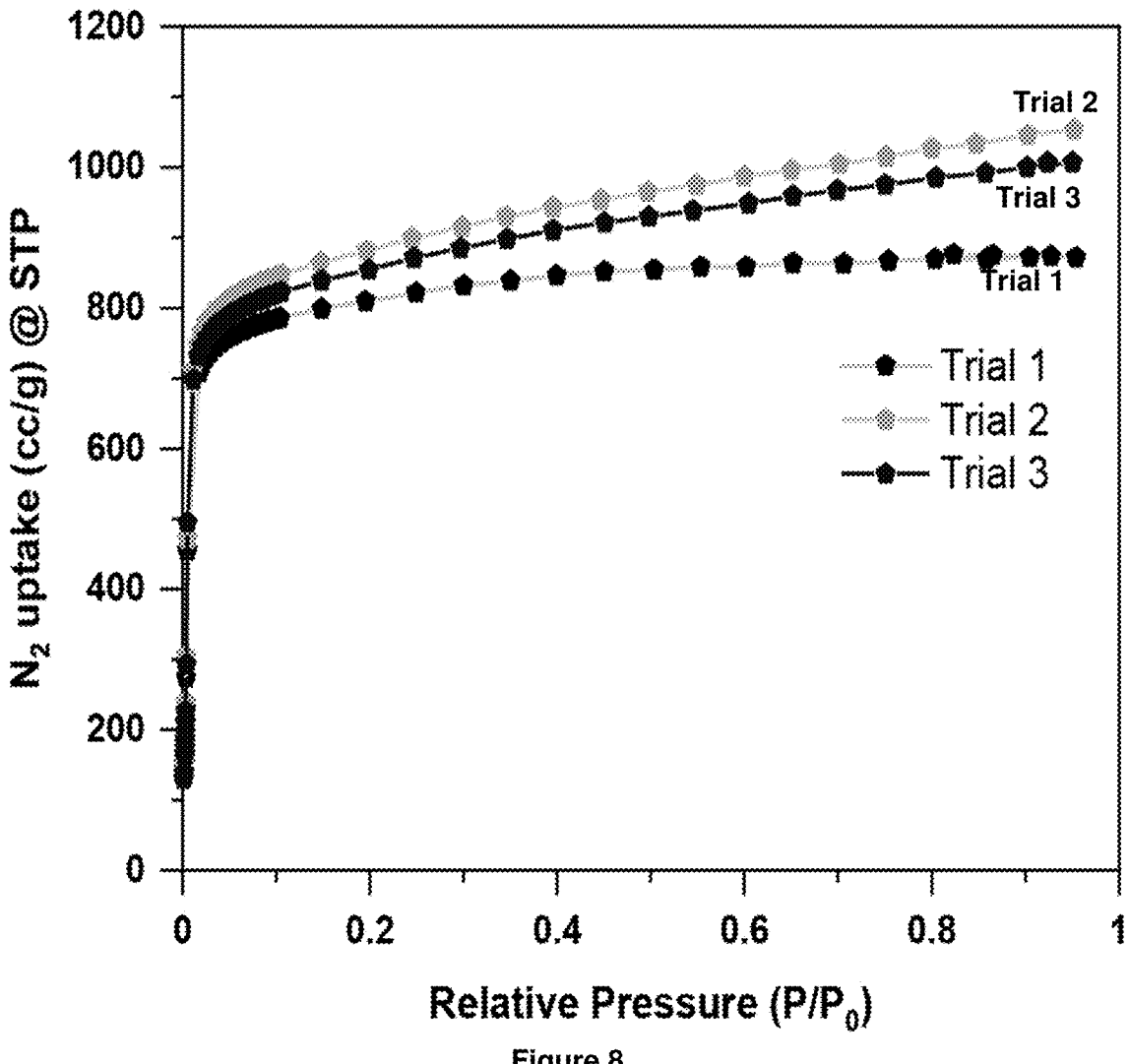
FIG. 8 is a graph of nitrogen sorption isotherms at 77K of twice DME exchanged and room temperature activated MOF-5, the material had an average BET surface area of 3350 $m^2$/g.

FIG. 7 shows the $^1$H-NMR spectrum of twice DME exchanged and digested MOF-5. FIG. 8 shows the $N_2$ sorption isotherm at 77K of twice DME exchanged and room temperature activated MOF-5. The method of the disclosure achieved an average BET surface area of 3350 $m^2/g$ HKUST-1: $H_2O$, EtOH, and DMF were combined in a 30 mL jar at a ratio of 1:1:1 (total volume 30 mL). To this mixture 0.6714 g of $Cu(NO_3)_2 \cdot 2.5H_2O$ and 0.3109 g of $H_3BTC$ were added. The mixture was then sonicated (approximately 15 minutes at 30° C.) to dissolve both the salt and linker. To this cloudy blue solution, 10-15 drops of concentrated HCl were added via glass pipette which turned the solution transparent. The contents of the jar were then transferred to three 20 mL scintillation vials (10 mL/vial). The vials were then placed in an oven, set to 85° C., for approximately 20 hours. The vials were then allowed to cool to room temperature and the mother liquor was decanted. The MOF was then combined into one vial and washed 3 times with fresh DMF and agitated on an IKA HS 260 shaker (120 rpm) to facilitate exchange.

Figure 9:
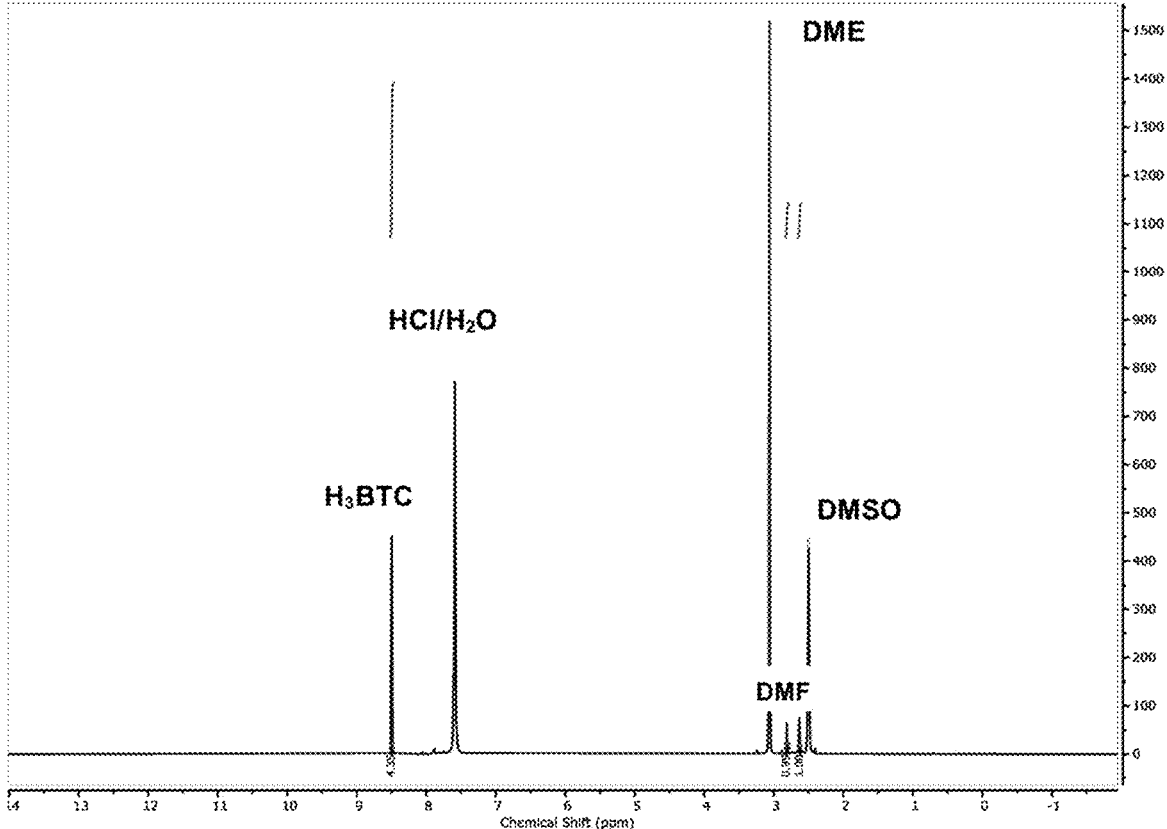
FIG. 9 is an $^1$H-NMR spectrum of 1-hour DME exchanged and digested HKUST-1.

FIG. 9 shows the $^1$H-NMR spectrum of 1-hour DME exchanged and digested HKUST-1. FIG. 10 shows the $^1$H-NMR spectrum of twice DME exchanged and digested HKUST-1.

FIG. 11 shows a two-dimensional contour plot of IR spectra of 1-hour DME exchanged HKUST-1, with experimental heating parameters set to 25-300° C. at a ramp rate of 5° C./min. FIG. 12 is an IR spectrum of DME from 1-hour DME exchanged HKUST-1, at 87° C. The spectrum illustrates the presence of DME and an absence of DMF after the exchange. FIG. 13 shows the TGA thermogram of DME exchanged HKUST-1 from room temperature to 300° C. with $1^{st}$ derivative thermogram. FIG. 14 shows the TGA thermogram of twice 1-hour DME exchanged HKUST-1 from room temperature to 300° C. with $1^{st}$ derivative thermogram. FIG. 15 shows the TGA thermogram of twice 4-hour DME exchanged HKUST-1 from room temperature to 300° C. with $1^{st}$ derivative thermogram.

Zn-MOF-74: This synthesis was scaled down and modified from a previously published procedure.[4] In a 55 mL vial, 0.125 g of $H_4DOBDC$ and 0.565 g of $Zn(NO_3)_2 \cdot 6H_2O$ were added then dissolved in 25 mL of DMF and 1.25 mL of $H_2O$. The mixture was sonicated for approximately 15 minutes at ~30° C. to dissolve the salt and linker. After sonicating, the solution was placed in an oven at 100° C. for ~20 hours. The vial was then removed from the oven and the hot mother liquor was decanted. The MOF was washed with MeOH 3 times over the course of 6 days. Once fully exchanged, the MOF was transferred to the DME apparatus for washing and activation.

Figure 16:
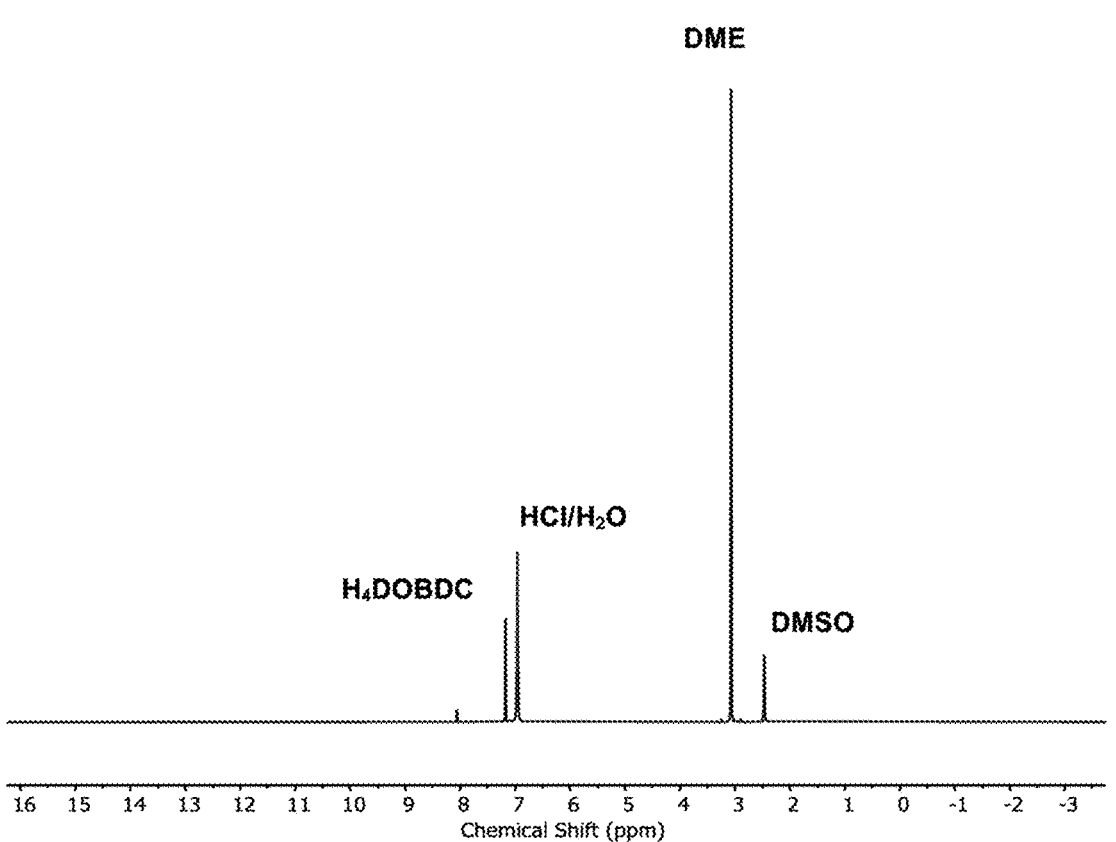
FIG. 16 is an $^1$H-NMR spectrum of twice DME exchanged and digested Zn-MOF-74.
Figures 17, 18:
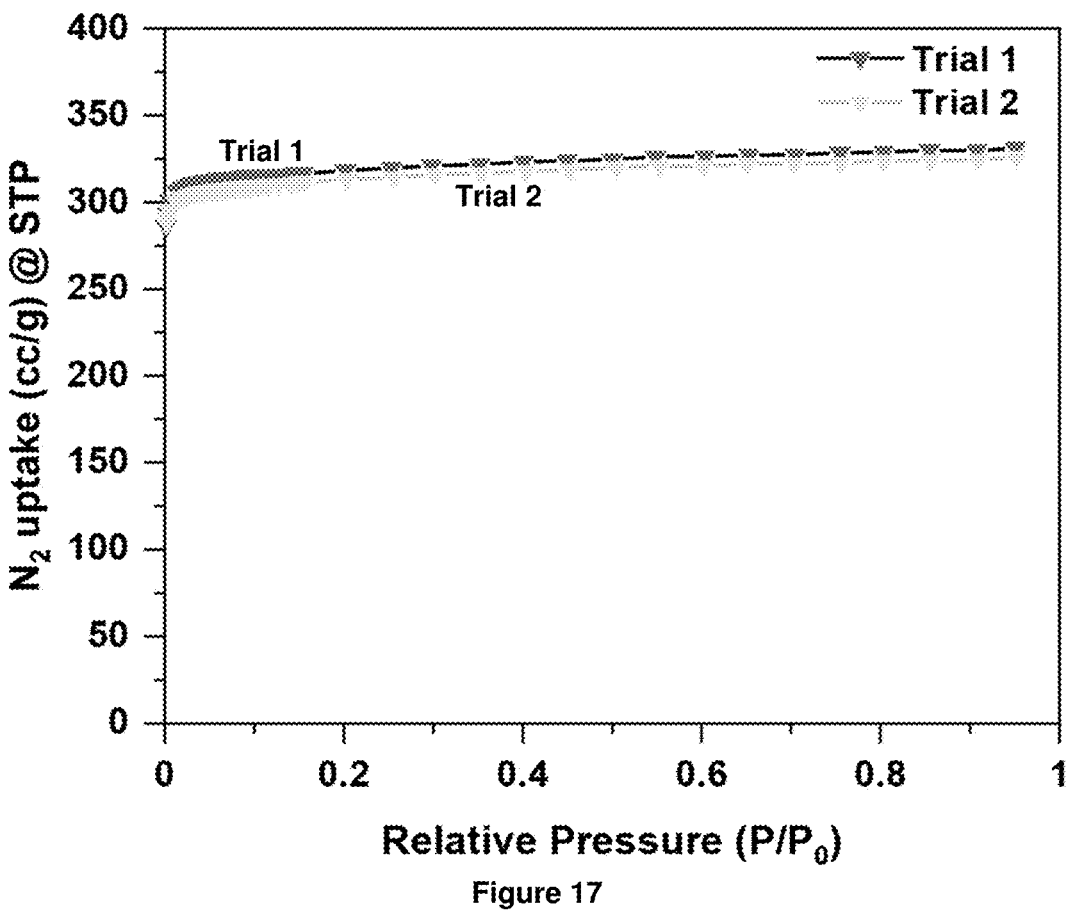
FIG. 17 is a graph of nitrogen sorption isotherms at 77K of twice exchanged DME activated Zn-MOF-74 at 120° C., the material had an average BET surface area of about 1250 $m^2$/g.
FIG. 18 is a schematic illustration of a synthesis scheme for synthesizing the linker ($H_3L$) for UMCM-151.

FIG. 16 shows the $^1$H-NMR spectrum of twice DME exchanged and digested Zn-MOF-74. FIG. 17 shows the $N_2$ sorption isotherms at 77K for twice DME exchanged activated Zn-MOF-74 at 120° C. An average BET surface area of about 1250 $m^2/g$ was achieved with the method of the disclosure.

Figure 19:
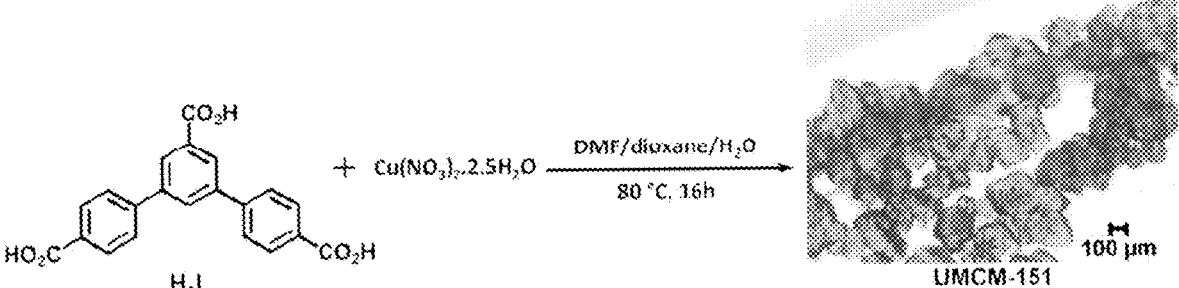
FIG. 19 is a schematic illustration of UMCM-151 synthesis.

UMCM-151: Referring to FIG. 18, the linker ($H_3L$) (50.05 mg) was added to a solution of DMF/dioxane/$H_2O$ (4:1:1, 10 mL total volume) in a 20-mL scintillation vial. To this mixture, $Cu(NO_3)_2 \cdot 2.5H_2O$ (96.04 mg) was added, and the contents were sonicated until dissolved and then heated at 80° C. for ~16 hours. Bluish green plate-like crystals were obtained, which were washed 3 times over an hour with DMF to ensure removal of unreacted linker. Multiple batches of the MOF were synthesized and stored in DMF to be treated with acetone or DME. The linker for UMCM-151 was synthesized following a published procedure shown in FIG. 19.

For conventional activation, the crystals were then exchanged with dry MeOH for 3 days, four times each day. The sample was further treated with dry acetone 3 times in 1 day. After removing acetone by decanting, the sample was dried under vacuum (0.03 Torr) at room temperature for 4 hours, and then further heated at 60° C. for 12 hours during which time the material turned green.

For DME activation, ~100 mg of MOF crystals stored in DMF were loaded into the DME exchange apparatus for exchange and activation, during which time the material turned blue.

Figure 20:
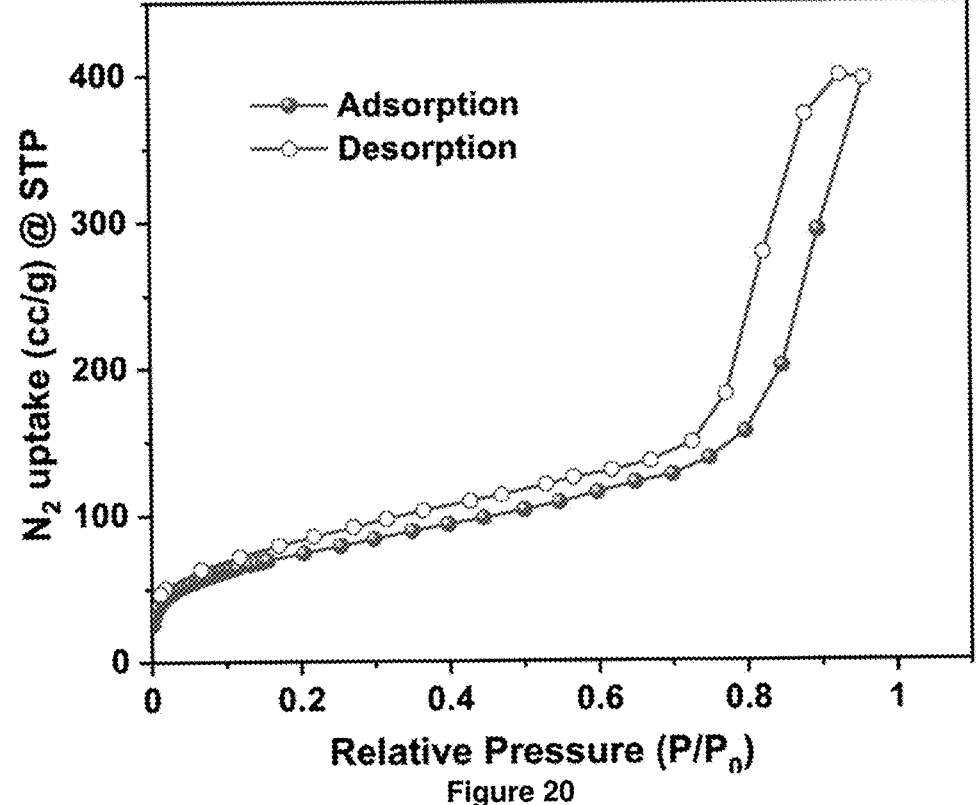
FIG. 20 is a graph of a nitrogen sorption isotherm at 77K for conventional heating activation of UMCM-151 at 60° C. from acetone, the material had a BET surface area of 263 m²/g.
Figure 21:
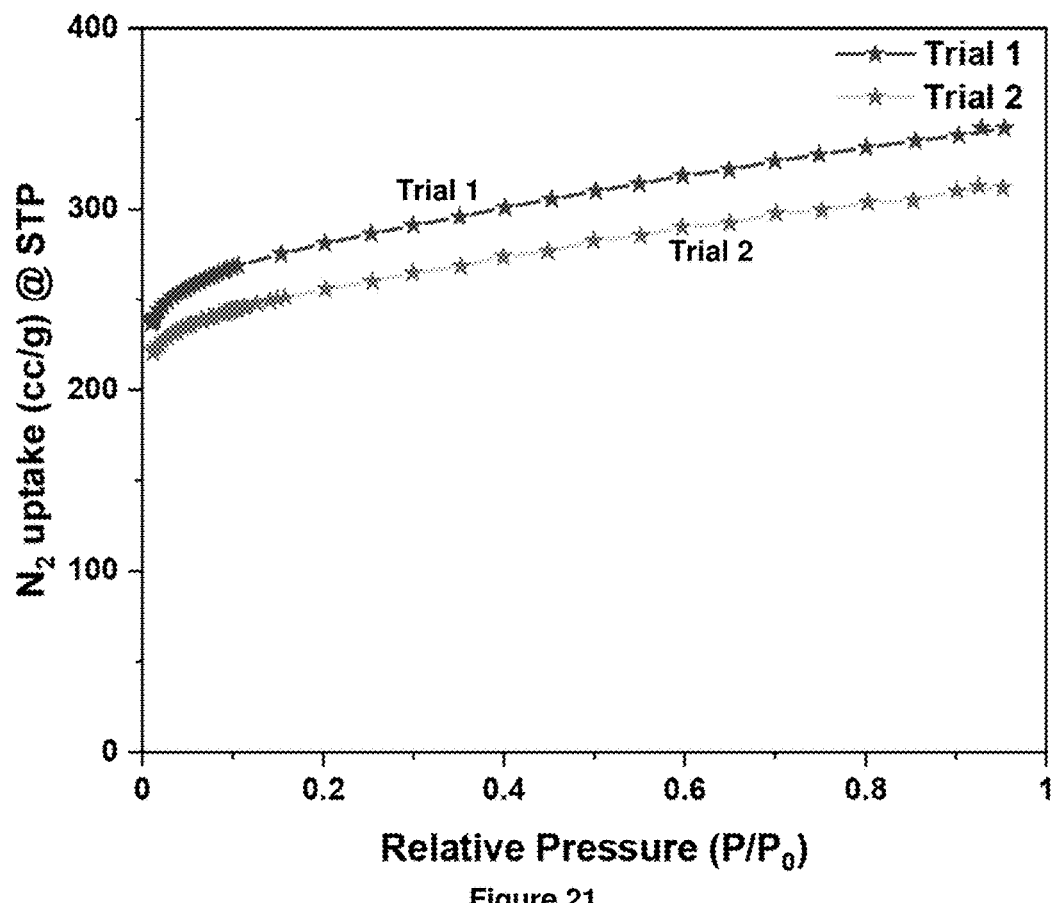
FIG. 21 is a graph of nitrogen sorption isotherms at 77K for twice DME exchanged room temperature activated UMCM-151, the material had a BET surface area of about 960 m²/g.
Figure 22:
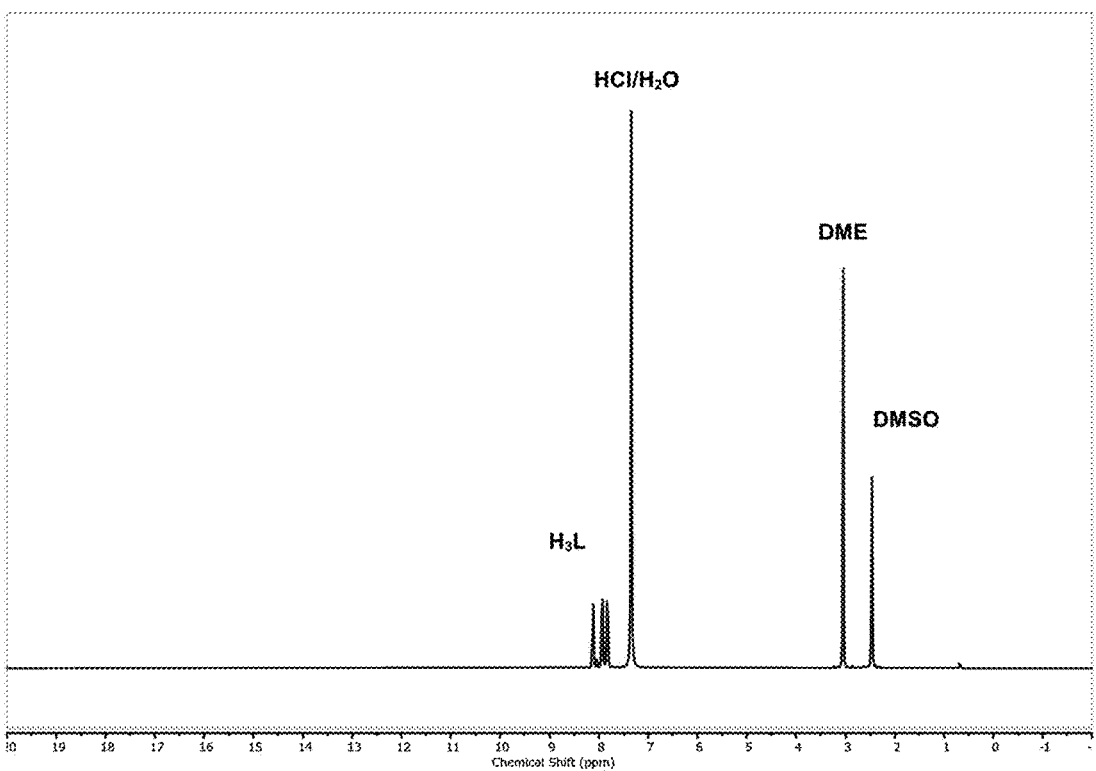
FIG. 22 is an ¹H-NMR spectrum of twice DME exchanged and digested UMCM-151.

FIG. 20 shows the $N_2$ sorption isotherm at 77K for conventional heating activation at 60° C. from acetone of UMCM-151, which achieved a BET surface area of 263 $m^2/g$. By comparison, FIG. 21 shows the $N_2$ sorption isotherms at 77K for twice DME exchanged room temperature activated UMCM-151, and that the method of the disclosure achieved a BET surface area of about 960 $m^2/g$. FIG. 22 shows the $^1$H-NMR spectrum of twice DME exchanged and digested UMCM-151.

DUT-34: DUT-34 was synthesized following a published literature with slight modifications.[6] $Cu(NO_3)_2 \cdot 2.5H_2O$ (241 mg), $H_3BTB$ (109 mg), and benzoic acid (299 mg) were added to a screw-capped vial (20 mL). The contents were dissolved in a mixture of DMF (5 mL), EtOH (abs., 5 mL), and pyridine (65 µl) through sonication for 5 min and then heated at 80° C. for ~20 hours. Clear light blue crystals were obtained. These crystals were washed repeatedly with DMF to ensure removal of unreacted linker. Crystals were washed with fresh DMF two times for 3 consecutive days and then exchanged with EtOH. EtOH exchange was performed 3 times in 1 day.

For conventional activation, ethanol solvated crystals were then activated through flowing supercritical $CO_2$ activation for a period of 5 hours. Following supercritical activation, the crystals were further heated under dynamic vacuum (0.01 Torr) at 80° C. for 12 hours.

For DME activation the material was loaded into the DME exchange apparatus (from DMF) and then exchanged and evacuated at room temperature following the procedure above during which time the material turned blue.

Figure 25:
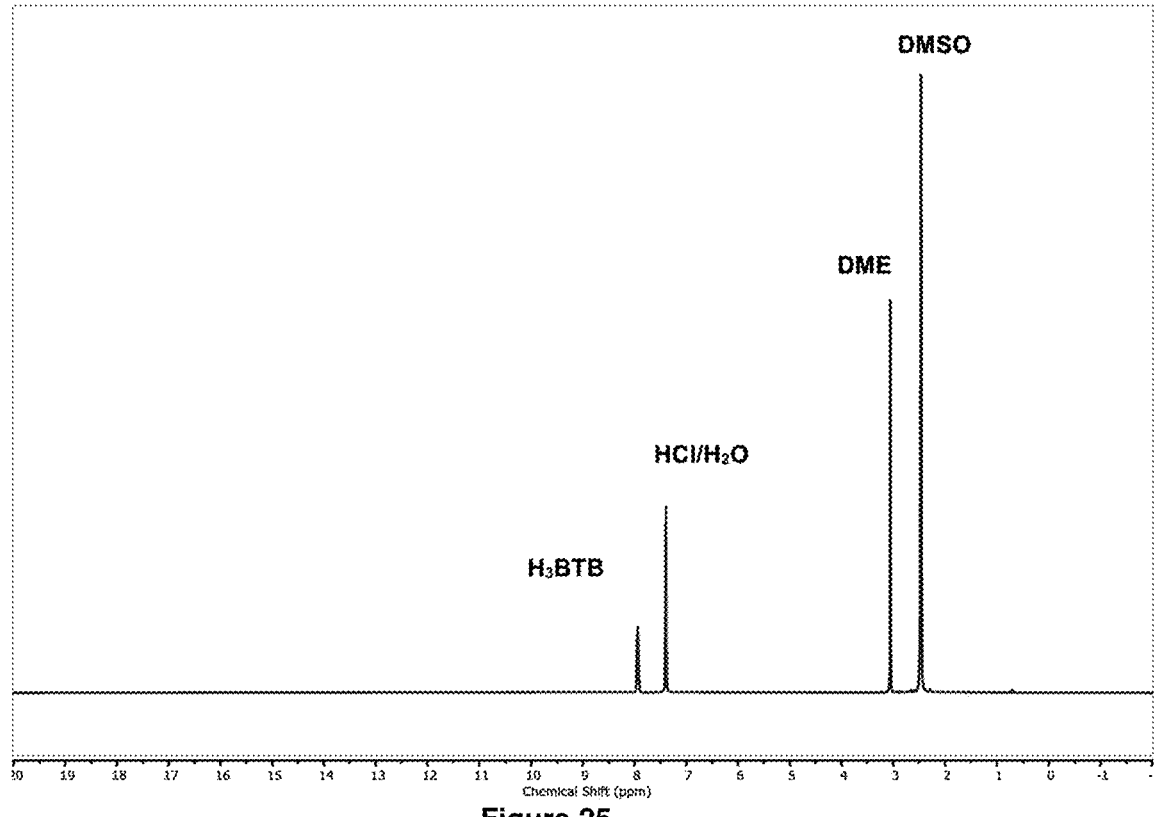
FIG. 25 is an ¹H-NMR spectrum of twice DME exchanged and digested DUT-34.

FIG. 23 shows the $N_2$ sorption isotherm at 77 K for supercritical $CO_2$ activated DUT-34. The conventional method resulted in the MOF having a BET surface area of 744 $m^2/g$. By comparison, FIG. 24, shows the $N_2$ isotherms at 77K for twice DME exchanged room temperature activated DUT-34, and the method of the disclosure achieved an average BET surface area of about 1600 $m^2/g$. FIG. 25 is the $^1$H-NMR spectrum of twice DME exchanged and digested DUT-34.

The foregoing description is given for clearness of understanding only, and no unnecessary limitations should be understood therefrom, as modifications within the scope of the disclosure may be apparent to those having ordinary skill in the art.

All patents, patent applications, government publications, government regulations, and literature references cited in this specification are hereby incorporated herein by reference in their entirety. In the case of conflict, the present description, including definitions, will control.

Throughout the specification, where the compounds, compositions, methods, and/or processes are described as including components, steps, or materials, it is contemplated that the compounds, compositions, methods, and/or processes can also comprise, consist essentially of, or consist of any combination of the recited components or materials, unless described otherwise. Component concentrations can be expressed in terms of weight concentrations, unless specifically indicated otherwise. Combinations of components are contemplated to include homogeneous and/or heterogeneous mixtures, as would be understood by a person of ordinary skill in the art in view of the foregoing disclosure.

Aspects

Aspect 1. A method of treating a solvent-containing metal-organic framework material to displace the solvent, comprising contacting the solvent-containing metal-organic framework material with a dimethyl ether, wherein the dimethyl ether exchanges with solvent present in the pores and coordinated on metal sites of the metal-organic-framework material to thereby provide a metal-organic framework material exchanged with dimethyl ether.

Aspect 2. The method of aspect 1, wherein contacting the solvent-containing metal-organic framework material comprises flowing the dimethyl ether over the solvent-containing metal-organic framework material continuously.

Aspect 3. The method of aspect 2, wherein flowing the dimethyl ether over the solvent-containing metal-organic framework comprises flowing the dimethyl ether into a container containing the solvent-containing metal-organic framework continuously while continuously venting the container.

Aspect 4. The method of aspect 1, wherein contacting the solvent-containing metal-organic framework material comprises filling a container containing the solvent-containing metal-organic framework material with the dimethyl ether and holding for a hold time prior to venting the container.

Aspect 5. The method of any one of aspects 1 to 4, wherein the dimethyl ether is flowed at gaseous pressure.

Aspect 6. The method of any one of aspects 1 to 4, wherein the dimethyl ether is flowed at liquid pressure.

Aspect 7. The method of any one of aspects 1 to 4, wherein the solvent-containing metal-organic framework material is in a container and the dimethyl ether is flowed into the container at gaseous and liquid pressures such that a mixture of gaseous and liquid dimethyl ether.

Aspect 8. The method of any one of aspects 1 to 7, wherein the solvent present in the solvent-containing metal-organic framework material is one or more of an alcohol, a ketone, and a formamide.

Aspect 9. The method of aspect 8, wherein the formamide is diethylformamide (DEF) and/or dimethylformamide (DMF).

Aspect 10. The method of aspect 8 or 9, wherein the alcohol is methanol and/or ethanol.

Aspect 11. The method of any one of aspects 8 to 10, wherein the ketone is acetone.

Aspect 12. The method of any one of aspects 1 to 11, wherein the solvent present in the solvent-containing metal-organic framework material is dimethylformamide (DMF) and/or methanol.

Aspect 13. The method of any one of aspects 1 to 12, further comprises applying a vacuum to the metal-organic framework material exchanged with dimethyl ether to remove residual solvent and dimethyl ether to thereby activate the metal-organic framework material.

Aspect 14. The method of aspect 13, comprising heating the metal-organic framework material exchanged with dimethyl ether while applying the vacuum.

Aspect 15. The method of aspect 14, wherein the temperature is less than 150° C.

Aspect 16. The method of aspect 14 or 15, wherein the metal-organic framework material exchanged with dimethyl ether is in an oil-bath while heated and applying the vacuum.

Aspect 17. The method of aspect 13, wherein the vacuum is applied at room temperature.

Aspect 18. The method of any one of the preceding aspects, wherein the solvent-containing metal-organic framework material comprises coordinatively unsaturated metal sites.

Aspect 19. The method of any one of the preceding aspects, wherein the solvent-containing metal-organic framework material is thermally sensitive.

Aspect 20. A method of activating a solvent-containing metal-organic framework material, comprising:
a. contacting the solvent-containing metal-organic framework material with a dimethyl ether, wherein the dimethyl ether exchanges with solvent present in the pores and coordinated on metal sites of the metal-organic-framework material to thereby provide a metal-organic framework material exchanged with dimethyl ether; and
b. applying a vacuum to the metal-organic framework material exchanged with dimethyl ether to remove residual solvent and dimethyl ether to thereby activate the metal-organic framework material.

Aspect 21. The method of aspect 20, comprising heating the metal-organic framework material exchanged with dimethyl ether while applying the vacuum.

Aspect 22. The method of aspect 21, wherein the temperature is less than 150° C.

Aspect 23. The method of aspect 21 or 22, wherein the metal-organic framework material exchanged with dimethyl ether is in an oil-bath while heated and applying the vacuum.

Aspect 24. The method of aspect 20, wherein the vacuum is applied at room temperature.

Aspect 25. The method of any one of aspects 20 to 24, wherein the solvent-containing metal-organic framework material comprises coordinatively unsaturated metal sites.

Aspect 26. The method of any one of aspects 20 to 25, wherein the solvent-containing metal-organic framework material is thermally sensitive.

Aspect 27. The method of any one of aspects 20 to 26, wherein contacting the solvent-containing metal-organic framework material comprises flowing the dimethyl ether over the solvent-containing metal-organic framework material continuously.

Aspect 28. The method of aspect 27, wherein flowing the dimethyl ether over the solvent-containing metal-organic framework comprises flowing the dimethyl ether into a container containing the solvent-containing metal-organic framework continuously while continuously venting the container.

Aspect 29. The method of any one of aspects 20 to 28, wherein contacting the solvent-containing metal-organic framework material comprises filling a container containing the solvent-containing metal-organic framework material with the dimethyl ether and holding for a hold time prior to venting the container.

Aspect 30. The method of any one of aspects 20 to 29, wherein the dimethyl ether is flowed at gaseous pressure.

Aspect 31. The method of any one of aspects 20 to 29, wherein the dimethyl ether is flowed at liquid pressure.

Aspect 32. The method of any one of aspects 20 to 29, wherein the solvent-containing metal-organic framework material is in a container and the dimethyl ether is flowed into the container at gaseous and liquid pressures such that a mixture of gaseous and liquid dimethyl ether.

Aspect 33. The method of any one of aspects 20 to 32, wherein the solvent present in the solvent-containing metal-organic framework material is one or more of an alcohol, a ketone, and a formamide.

Aspect 34. The method of aspect 33, wherein the formamide is diethylformamide (DEF) and/or dimethylformamide (DMF).

Aspect 35. The method of aspect 33 or 34, wherein the alcohol is methanol and/or ethanol.

Aspect 36. The method of any one of aspects 33 to 35, wherein the ketone is acetone.

Aspect 37. The method of any one of aspects 33 to 36, wherein the solvent present in the solvent-containing metal-organic framework material is dimethylformamide (DMF) and/or methanol.

REFERENCES (1) Ma, J.; Kalenak, A.; Wong-Foy, A. G.; Matzger, A. J. Rapid Guest Exchange and Ultra-Low Surface Tension Solvents Optimize Metal-Organic Framework Activation. *Angew. Chem. Int. Ed.* 2017, 56, 14618.

(2) Howarth, A. J.; Peters, A. W.; Vermeulen, N. A.; Wang, T. C.; Hupp, J. T.; Farha, O. K. Best Practices for the Synthesis, Activation, and Characterization of Metal-Organic Frameworks. *Chem. Mater.* 2017, 29, 26-39.

(3) Dodson, R. A.; Wong-Foy, A. G.; Matzger, A. J. The Metal-Organic Framework Collapse Continuum: Insights from Two-Dimensional Powder X-Ray Diffraction. *Chem. Mater.* 2018, 30, 6559-6565.

(4) Feng, L.; Wang, K.-Y.; Day, G. S.; Ryder, M. R.; Zhou, H.-C. Destruction of Metal-Organic Frameworks: Positive and Negative Aspects of Stability and Lability. *Chem. Rev.* 2020, 120, 13087-13133.

(5) Rowsell, J. L. C.; Yaghi, O. M. Strategies for Hydrogen Storage in Metal-Organic Frameworks. *Angew. Chem. Int. Ed.* 2005, 44, 4670-4679.

(6) Horike, S.; Dinca, M.; Tamaki, K.; Long, J. R. Size-Selective Lewis Acid Catalysis in a Microporous Metal-Organic Framework with Exposed $Mn^{2+}$ Coordination Sites. *J. Am. Chem. Soc.* 2008, 130, 5854-5855.

(7) Wang, Q.; Astruc, D. State of the Art and Prospects in Metal-Organic Framework (MOF)-Based and MOF-Derived Nanocatalysis. *Chem. Rev.* 2020, 120, 1438-1511.

(8) Li, H.; Eddaoudi, M.; Groy, T. L.; Yaghi, O. M. Establishing Microporosity in Open Metal-Organic Frameworks: Gas Sorption Isotherms for Zn(BDC) (BDC=1,4-Benzenedicarboxylate). *J. Am. Chem. Soc.* 1998, 120, 8571-8572.

(9) Farha, O. K.; Hupp, J. T. Rational Design, Synthesis, Purification, and Activation of Metal-Organic Framework Materials. *Acc. Chem. Res.* 2010, 43, 1166-1175.

(10) Mondloch, J. E.; Karagiaridi, O.; Farha, O. K.; Hupp, J. T. Activation of Metal-Organic Framework Materials. *CrystEngComm* 2013, 15, 9258-9264.

(11) Mondloch, J. E.; Katz, M. J.; Planas, N.; Semrouni, D.; Gagliardi, L.; Hupp, J. T.; Farha, O. K. Are $Zr_6$-Based MOFs Water Stable? Linker Hydrolysis vs. Capillary-Force-Driven Channel Collapse. *Chem. Commun.* 2014, 50, 8944-8946.

(12) Ayoub, G.; Islamoglu, T.; Goswami, S.; Friščić, T.; Farha, O. K. Torsion Angle Effect on the Activation of UiO Metal-Organic Frameworks. *ACS Appl. Mater. Interfaces* 2019, 11, 15788-15794.

(13) Dodson, R. A.; Matzger, A. J. Resolution-Based Damage to Metal-Organic Frameworks and Approaches to Mitigation. ACS *Mater. Lett.* 2019, 1, 344-349.

(14) Nelson, A. P.; Farha, O. K.; Mulfort, K. L.; Hupp, J. T. Supercritical Processing as a Route to High Internal Surface Areas and Permanent Microporosity in Metal-Organic Framework Materials. *J. Am. Chem. Soc.* 2009, 131, 458-460.

(15) Liu, B.; Wong-Foy, A. G.; Matzger, A. J. Rapid and Enhanced Activation of Microporous Coordination Polymers by Flowing Supercritical $CO_2$. *Chem. Commun.* 2013, 49, 1419-1421.

(16) Kennedy, R. M.; Sagenkahn, M.; Aston, J. G. The Heat Capacity and Entropy, Heats of Fusion and Vaporization, and the Vapor Pressure of Dimethyl Ether. The Density of Gaseous Dimethyl Ether. *J. Am. Chem. Soc.* 1941, 63, 2267-2272.

(17) Wu, J.; Liu, Z.; Pan, J.; Zhao, X. Vapor Pressure Measurements of Dimethyl Ether from (233 to 399) K. *J. Chem. Eng. Data* 2004, 49, 32-34.

(18) Wu, J.; Yin, J. Vapor Pressure Measurements of Dimethyl Ether from (213 to 393) K. *J. Chem. Eng. Data* 2008, 53, 2247-2249.

(19) Wu, J.; Magee, J. W. Heat Capacity of Saturated and Compressed Liquid Dimethyl Ether at Temperatures from (132 to 345) K and at Pressures to 35 MPa. *J. Chem. Eng. Data* 2018, 63, 1713-1723.

(20) Rosi Nathaniel L.; Eckert Juergen; Eddaoudi Mohamed; Vodak David T.; Kim Jaheon; O'Keeffe Michael; Yaghi Omar M. Hydrogen Storage in Microporous Metal-Organic Frameworks. *Science* 2003, 300, 1127-1129.

(21) Boissonnault, J. A.; Wong-Foy, A. G.; Matzger, A. J. Purification of Chloromethane by Selective Adsorption of Dimethyl Ether on Microporous Coordination Polymers. *Langmuir* 2016, 32, 9743-9747.

(22) Moosavi, S.; Chidambaram, A.; Talirz, L.; Haranczyk, M.; Stylianou, K.; Smit, B. Capturing Chemical Intuition in Synthesis of Metal-Organic Frameworks. *Nat. Commun.* 2019, 539, 1-7.

(23) Chui, S.; Lo, S.; Charmant, J.; Orpen, A.; Williams, I. A Chemically Functionalizable Nanoporous Material [Cu3(TMA)2(H2O)3]n. *Science* 1999, 283, 1148-1150.

(24) Düren, T.; Millange, F.; Férey, G.; Walton, K. S.; Snurr, R. Q. Calculating Geometric Surface Areas as a Characterization Tool for Metal-Organic Frameworks. *J. Phys. Chem. C* 2007, 111 (42), 15350-15356.

(25) Elsaidi, S.; Ongari, D.; Xu, W.; Mohamed, M.; Haranczyk, M.; Thallapally, P. Xenon Recovery at Room Temperature Using Metal-Organic Frameworks. *Chem. Eur. J.* 2017, 23, 10758.

(26) Hendon, C.; Walsh, A. Chemical Principles Underpinning the Performance of the Metal-Organic Framework HKUST-1. R. Soc. Chem. 2015, 6, 3674-3683.

(27) Schnobrich, J. K.; Lebel, O.; Cychosz, K. A.; Dailly, A.; Wong-Foy, A. G.; Matzger, A. J. Linker-Directed Vertex Desymmetrization for the Production of Coordination Polymers with High Porosity. *J. Am. Chem. Soc.* 2010, 132, 13941-13948.

(28) Klein, N.; Senkovska, I.; Baburin, I. A.; Grünker, R.; Stoeck, U.; Schlichtenmayer, M.; Streppel, B.; Mueller, U.; Leoni, S.; Hirscher, M.; Kaskel, S. Route to a Family of Robust, Non-Interpenetrated Metal-Organic Frameworks with Pto-like Topology. *Chem. Eur. J.* 2011, 17, 13007-13016.

(29) Bae, J.; Lee, C. Y.; Jeong, N. C. Weak Coordination Bond of Chloromethane: A Unique Way to Activate Metal Node Within an Unstable Metal-Organic Framework DUT-34. *Bull. Korean Chem. Soc.* 2021, 42, 658-666.

(30) Rowsell, J. L. C.; Yaghi, O. M. Effects of Functionalization, Catenation, and Variation of the Metal Oxide and Organic Linking Units on the Low-Pressure Hydrogen Adsorption Properties of Metal-Organic Frameworks. *J. Am. Chem. Soc.* 2006, 128, 1304-1315.

(31) Dietzel, P.; Johnsen, R.; Blom, R.; Fjellvag, H. Structural Changes and Coordinatively Unsaturated Metal Atoms on Dehydration of Honeycomb Analogous Microporous Metal-Organic Frameworks. *Chem. Eur. J.* 2008, 14, 2389-2397.

(32) Caskey, S. R.; Wong-Foy, A. G.; Matzger, A. J. Dramatic Tuning of Carbon Dioxide Uptake via Metal Substitution in a Coordination Polymer with Cylindrical Pores. *J. Am. Chem. Soc.* 2008, 130, 10870-10871.

(33) Kizzie, A. C.; Wong-Foy, A. G.; Matzger, A. J. Effect of Humidity on the Performance of Microporous Coordination Polymers as Adsorbents for $CO_2$ Capture. *Langmuir* 2011, 27, 6368-6373.

(34) Millward, A. R.; Yaghi, O. M. Metal-Organic Frameworks with Exceptionally High Capacity for Storage of Carbon Dioxide at Room Temperature. *J. Am. Chem. Soc.* 2005, 127, 17998-17999.

Dodson, R.; Wong-Foy, A.; Matzger, A. The Metal-Organic Framework Collapse Continuum: Insights from Two-Dimensional Powder X-ray Diffraction. *J. Chem. Mater.,* 2017, 6559-6565.

Ma, J.; Kalenak, A.; Wong-Foy, A.; Matzger, A. J. Rapid Guest Exchange and Ultra-Low Surface Tension Solvents Optimize Metal-Organic Framework Activation. *Agnew Chem* Int. Ed, 2017, 14618.

Feldblyum, J.; Lui, M.; Gidley, D.; Matzger, A. J. Reconciling the Discrepancies between Crystallographic Porosity and Guest Access As Exemplified by Zn-HKUST-1. *J. Am. Chem. Soc.;* 2011, 18257-18263.

Kizzie, A.; Wong-Foy, A.; Matzger, A. J. Effect of humidity on the performance of microporous coordination polymers as adsorbents for $CO_2$ capture. *Langmuir,* 2011, 6368-6373.

Schnobrich, J. K.; Lebel, O.; Cychosz, K. A.; Dailly, A.; Wong-Foy, A. G.; Matzger, A. J. Linker-Directed Vertex Desymmetrization for the Production of Coordination Polymers with High Porosity. *J. Am. Chem. Soc.* 2010, 132 (39), 13941-13948.

Klein, N.; Senkovska, I.; Baburin, I. A.; Grünker, R.; Stoeck, U.; Schlichtenmayer, M.; Streppel, B.; Mueller, U.; Leoni, S.; Hirscher, M.; Kaskel, S. Route to a Family of Robustm Non-interpenetrated Metal-Organic Frameworks with pto-like Topology. *Chemistry—A European Journal* 2011, 17 (46), 13007-13016.

Liu, B.; Wong-Foy, A. G.; Matzger, A. J. Rapid and Enhanced Activation of Microporous Coordination Polymers by Flowing Supercritical $CO_2$. *Chem. Commun.* 2013, 49, 1419-1421.

What is claimed is:

1. A method of treating a solvent-containing metal-organic framework material to displace the solvent, comprising contacting the solvent-containing metal-organic framework material with a dimethyl ether, wherein the dimethyl ether exchanges with solvent present in pores and coordinated on metal sites of the metal-organic framework material to thereby provide a metal-organic framework material exchanged with dimethyl ether.

2. The method of claim 1, wherein contacting the solvent-containing metal-organic framework material comprises:

flowing the dimethyl ether over the solvent-containing metal-organic framework material continuously, or filling a container containing the solvent-containing metal-organic framework material with the dimethyl ether and holding for a hold time prior to venting the container.

3. The method of claim 2, wherein flowing the dimethyl ether over the solvent-containing containing metal-organic framework material comprises flowing the dimethyl ether into a container containing the solvent-containing metal-organic framework material continuously while continuously venting the container.

4. The method of claim 2, wherein the dimethyl ether is flowed at gaseous pressure and/or liquid pressure.

5. The method of claim 1, wherein the solvent present in the solvent-containing metal-organic framework material is one or more of an alcohol, a ketone, and a formamide.

6. The method of claim 5, wherein the formamide is diethylformamide (DEF) and/or dimethylformamide (DMF), the alcohol is methanol and/or ethanol, and/or the ketone is acetone.

7. The method of claim 1, wherein the solvent present in the solvent-containing metal-organic framework material is dimethylformamide (DMF) and/or methanol.

8. The method of claim 1, wherein the solvent-containing metal-organic framework material comprises coordinatively unsaturated metal sites and/or the solvent-containing metal-organic framework material is thermally sensitive.

9. A method of activating a solvent-containing metal-organic framework material, comprising:

contacting the solvent-containing metal-organic framework material with a dimethyl ether, wherein the dimethyl ether exchanges with solvent present in pores and coordinated on metal sites of the metal-organic-framework material to thereby provide a metal-organic framework material exchanged with dimethyl ether; and applying a vacuum to the metal-organic framework material exchanged with dimethyl ether to remove residual solvent and dimethyl ether to thereby activate the metal-organic framework material.

10. The method of claim 9, comprising heating the metal-organic framework material exchanged with dimethyl ether while applying the vacuum.

11. The method of claim 10, wherein the heating temperature is less than 150° C.

12. The method of claim 10, wherein the metal-organic framework material exchanged with dimethyl ether is in an oil-bath while heating and applying the vacuum.

13. The method of claim 9, wherein the vacuum is applied at room temperature.

14. The method of claim 9, wherein the solvent-containing metal-organic framework material comprises coordinatively unsaturated metal sites and/or the solvent-containing metal-organic framework material is thermally sensitive.

15. The method of claim 9, wherein contacting the solvent-containing metal-organic framework material comprises:

flowing the dimethyl ether over the solvent-containing metal-organic framework material continuously, or filling a container containing the solvent-containing metal-organic framework material with the dimethyl ether and holding for a hold time prior to venting the container.

16. The method of claim 15, wherein flowing the dimethyl ether over the solvent-containing metal-organic framework material comprises flowing the dimethyl ether into a container containing the solvent-containing metal-organic framework material continuously while continuously venting the container.

17. The method of claim 9, wherein the dimethyl ether is flowed at gaseous pressure and/or liquid pressure.

18. The method of claim 9, wherein the solvent present in the solvent-containing metal-organic framework material is one or more of an alcohol, a ketone, and a formamide.

19. The method of claim 18, wherein the formamide is diethylformamide (DEF) and/or dimethylformamide (DMF), the alcohol is methanol and/or ethanol, and/or the ketone is acetone.

20. The method of any one of claim 19, wherein the solvent present in the solvent-containing metal-organic framework material is dimethylformamide (DMF) and/or methanol.

* * * * *